United States Patent
Yanai

(10) Patent No.: US 9,106,863 B2
(45) Date of Patent: Aug. 11, 2015

(54) IMAGE PROCESSING APPARATUS AND CONTROL METHOD THEREOF

(75) Inventor: Tomokazu Yanai, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 146 days.

(21) Appl. No.: 13/567,658

(22) Filed: Aug. 6, 2012

(65) Prior Publication Data

US 2013/0038907 A1    Feb. 14, 2013

(30) Foreign Application Priority Data

Aug. 9, 2011   (JP) .................................. 2011-173964

(51) Int. Cl.
  H04N 1/40      (2006.01)
  B41J 2/325     (2006.01)
  H04N 1/405     (2006.01)
  G06K 15/10     (2006.01)

(52) U.S. Cl.
  CPC ............ *H04N 1/4051* (2013.01); *G06K 15/105* (2013.01); *G06K 15/102* (2013.01); *G06K 15/107* (2013.01)

(58) Field of Classification Search
  USPC .................. 358/3.06–3.2, 533–536
  See application file for complete search history.

(56) References Cited

U.S. PATENT DOCUMENTS

| | | | | |
|---|---|---|---|---|
| 6,250,734 B1* | 6/2001 | Otsuki | | 347/16 |
| 6,511,143 B1* | 1/2003 | Ishikawa et al. | | 347/9 |
| 6,543,870 B1* | 4/2003 | Kakutani | | 347/15 |
| 6,655,773 B2* | 12/2003 | Gotoh et al. | | 347/15 |
| 6,665,091 B1* | 12/2003 | Saruta | | 358/1.5 |
| 7,986,440 B2* | 7/2011 | Yanai et al. | | 358/2.1 |
| 8,130,415 B2* | 3/2012 | Yanai et al. | | 358/2.1 |
| 8,482,792 B2* | 7/2013 | Yanai | | 358/1.9 |
| 8,576,452 B2* | 11/2013 | Hansaki et al. | | 358/3.21 |
| 8,922,856 B2* | 12/2014 | Yanai et al. | | 358/534 |
| 2003/0202215 A1* | 10/2003 | Biddle et al. | | 358/3.26 |
| 2004/0070638 A1* | 4/2004 | Takahashi et al. | | 347/12 |
| 2007/0097164 A1* | 5/2007 | Marumoto | | 347/15 |
| 2007/0109603 A1* | 5/2007 | Sakai | | 358/3.13 |
| 2008/0036811 A1* | 2/2008 | Heydinger | | 347/15 |
| 2008/0180475 A1* | 7/2008 | Eldar et al. | | 347/13 |
| 2009/0153606 A1* | 6/2009 | Mizutani et al. | | 347/12 |
| 2009/0168087 A1* | 7/2009 | Fujimoto et al. | | 358/1.9 |

(Continued)

FOREIGN PATENT DOCUMENTS

| JP | 2007-106097 A | 4/2007 |
|---|---|---|
| JP | 2008-067049 A | 3/2008 |
| JP | 2008-188805 A | 8/2008 |

(Continued)

*Primary Examiner* — Richard Zhu
(74) *Attorney, Agent, or Firm* — Canon USA Inc IP Division

(57) ABSTRACT

An image forming apparatus that forms an image on a recording medium by performing recording (N) times (N is an integer of 3 or more) in a same region on the recording medium, the image forming apparatus includes a recording data generation unit configured to generate recoding data corresponding to each of the recording and a halftone processing unit configured to convert the recording data into halftone image data by a dither method using a matrix of a dot dispersion type, wherein the halftone processing unit generates the halftone image data of the (k)th time in such a manner that dispersibility of a dot pattern is improved in which each of the halftone image data corresponding to recording performed up to (k)th ($2 \le p \le N-1$) time is accumulated in the same region.

12 Claims, 29 Drawing Sheets

(56) References Cited

U.S. PATENT DOCUMENTS

2009/0244631 A1* 10/2009 Hansaki et al. ............. 358/3.03
2009/0310150 A1* 12/2009 Marumoto .................... 358/1.8

FOREIGN PATENT DOCUMENTS

| | | |
|---|---|---|
| JP | 2009-262457 A | 11/2009 |
| WO | 2008/075729 A1 | 6/2008 |

* cited by examiner

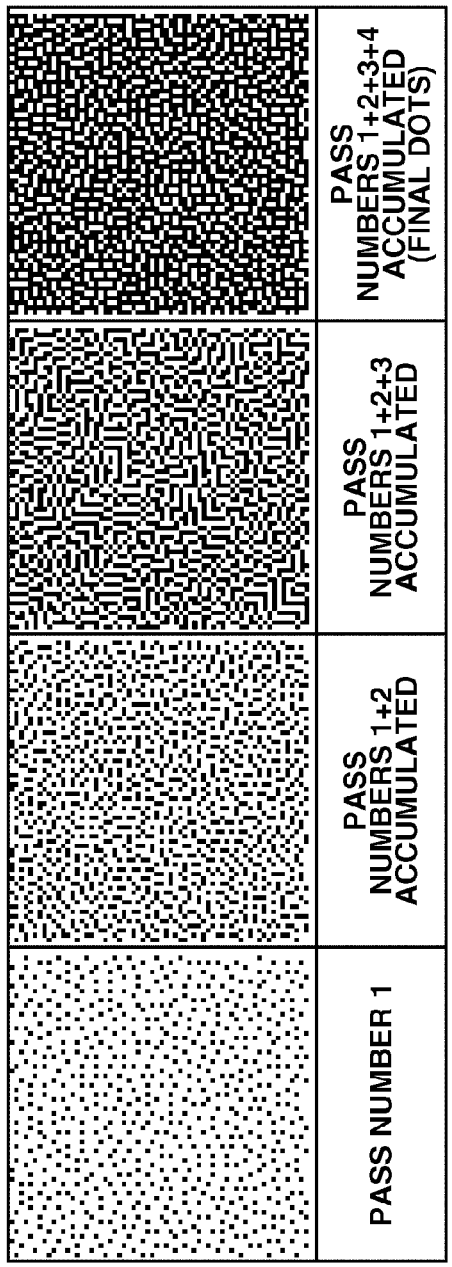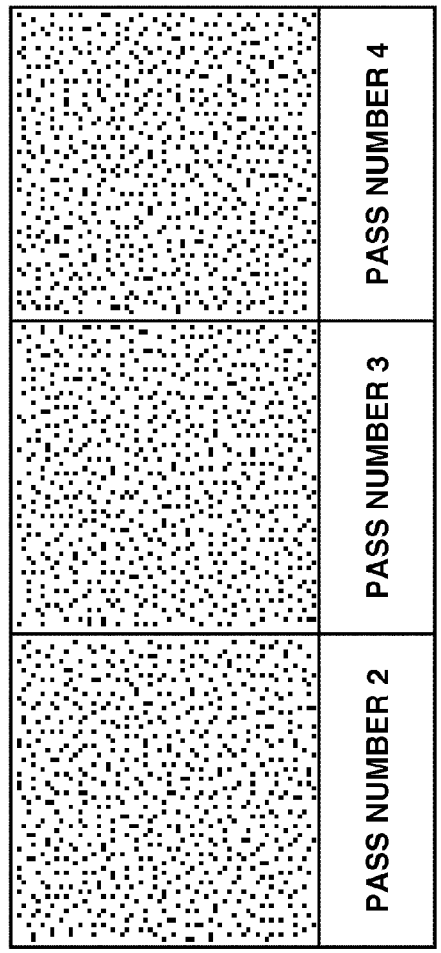

FREQUENCY
CHARACTERISTIC
OF PASS 1

FREQUENCY
CHARACTERISTIC
OF ACCUMULATED
IMAGES OF PASSES 1+2

FREQUENCY
CHARACTERISTIC OF
ACCUMULATED IMAGES
OF PASSES 1+2+3

FREQUENCY
CHARACTERISTIC OF
ACCUMULATED IMAGES
OF PASSES 1+2+3+4
(FINAL PATTERN)

| 1 | 136 | 34 | 170 |
|---|-----|-----|-----|
| 204 | 68 | 238 | 102 |
| 51 | 187 | 17 | 153 |
| 255 | 119 | 221 | 85 |

| PASS 1 | | | | PASSES 1+2 ACCUMULATED | | | | PASSES 1+2+3 ACCUMULATED | | | | PASSES 1+2+3+4 ACCUMULATED (FINAL IMAGE) | | | |
|---|---|---|---|---|---|---|---|---|---|---|---|---|---|---|---|
| 255 | 0 | 255 | 0 | 255 | 0 | 255 | 0 | 255 | 0 | 255 | 0 | 255 | 255 | 255 | 0 |
| 0 | 0 | 0 | 0 | 0 | 255 | 0 | 0 | 0 | 255 | 0 | 255 | 0 | 255 | 0 | 255 |
| 0 | 0 | 255 | 0 | 255 | 0 | 255 | 0 | 255 | 0 | 255 | 0 | 255 | 0 | 255 | 255 |
| 0 | 0 | 0 | 0 | 0 | 0 | 0 | 0 | 0 | 0 | 0 | 255 | 0 | 255 | 0 | 255 |

FIG.25E FIG.25F FIG.25G

| PASS 2 | | | | PASS 3 | | | | PASS 4 | | | |
|---|---|---|---|---|---|---|---|---|---|---|---|
| 0 | 0 | 0 | 0 | 0 | 0 | 0 | 0 | 0 | 255 | 0 | 0 |
| 0 | 255 | 0 | 0 | 0 | 0 | 0 | 255 | 0 | 0 | 0 | 0 |
| 255 | 0 | 0 | 0 | 0 | 0 | 0 | 0 | 0 | 0 | 0 | 255 |
| 0 | 0 | 0 | 0 | 0 | 0 | 0 | 255 | 0 | 255 | 0 | 0 |

| Th_1 | | | | Th_2 | | | | | Th_n | | | |
|---|---|---|---|---|---|---|---|---|---|---|---|---|
| 0 | 136 | 34 | 170 | 34 | 170 | 0 | 136 | | 170 | 0 | 136 | 34 |
| 204 | 68 | 238 | 102 | 238 | 102 | 204 | 68 | ... | 102 | 204 | 68 | 238 |
| 51 | 187 | 17 | 153 | 17 | 153 | 51 | 187 | | 153 | 51 | 187 | 17 |
| 255 | 119 | 221 | 85 | 221 | 85 | 255 | 119 | | 85 | 255 | 119 | 221 |

IMAGE PROCESSING APPARATUS AND CONTROL METHOD THEREOF

BACKGROUND OF THE INVENTION

1. Field of the Invention

The present invention relates to an image processing apparatus for forming an image by performing recording a plurality of times and a control method thereof.

2. Description of the Related Art

In recent years, many people have been printing image data processed by a personal computer (PC). Compared with the number of gradations of the image data processed by the PC, an image forming apparatus may express only a smaller number of gradations per pixel. In such a case, halftone processing is required for converting the number of gradations of input image data into the number of gradations that can be expressed by an output apparatus. As one method of the halftone processing, a dither method is known. The dither method determines an output value for each pixel by comparing a pixel value of the input image data with a threshold value corresponding to the pixel in a threshold value matrix.

Since the dither method does not require complicated operations, compared with an error diffusion method known as another method of the halftone processing, it can perform speedy processing. Further, by using a threshold value matrix of a blue noise type in which a spatial frequency of dot layout in the output image data is set to a high frequency, the dither method can generate the image data having high dispersibility equivalent to that of the error diffusion method. The Japanese Patent Application Laid-Open No. 2008-067049 discusses a method for determining, with use of the threshold value matrix of the blue noise type described above, an order of forming dots and layout of the dots when the image forming apparatus forms the image.

According to the method described in the Japanese Patent Application Laid-Open No. 2008-067049, the dither processing is performed on each recording data corresponding to record-scanning, using the threshold value matrix of a blue noise type. With this processing, the dispersibility of scanning is improved and, even if the image forming apparatus generates physical registration shift, a dot pattern having less granularity deterioration can be formed.

According to the method described in the Japanese Patent Application Laid-Open No. 2008-067049, the dot pattern of each scanning has blue-noise characteristic, however, the dot pattern in which the image data is accumulated by each scanning is not taken into consideration. Thus, when printing is performed by the image forming apparatus that forms the image by performing record-scanning on a same region a plurality of times, due to a process of forming the image, sufficient dispersibility may not be able to be acquired. As an example, a case will be described where the image is formed by four-times-record-scanning.

According to the method described in Japanese Patent Application Laid-Open No. 2008-067049, each single dot layout of the recording data corresponding to each of four-time-record-scanning has the blue-noise characteristic, and thus individually has high dispersibility. However, after first record-scanning is performed, second record-scanning is further performed, and then the accumulated dot pattern does not have the blue-noise characteristic. Therefore, in the image forming processing in which the image forming apparatus performs printing, the dots are arranged coarse and thick. Thus, liquid drops interfere each other or their interactions occur, thereby deteriorating the granularity acquired as a result.

SUMMARY OF THE INVENTION

The present invention is directed to, in consideration of forming processing of an image, generate image data that can be output in a dot pattern having higher dispersibility.

According to an aspect of the present invention, an image processing apparatus of the present invention for forming an image on a recording medium by performing recording (N) times (N is an integer of 3 or more) in a same region on the recording medium, includes a recording data generation unit configured to generate recording data corresponding to each of the recording and a halftone processing unit configured to convert the recording data into halftone image data by a dither method using a matrix of a dot dispersion type, wherein the halftone processing unit generates the halftone image data of the (p)th time in such a manner that dispersibility of a dot pattern is improved in which each of the halftone image data corresponding to recording performed up to (p)th ($2 \leq p \leq N-1$) time is accumulated in the same region.

According to the present invention, the image can be generated that keeps a dot pattern having higher dispersibility even after the image forming processing has been performed, and finally the higher granularity can be acquired.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 15A to 15G illustrate results of halftone processing.

FIG. 23 illustrates a threshold value matrix.

FIG. 24 illustrates halftone image data of each pass.

FIGS. 25A to 25G illustrate accumulated halftone image data.

FIG. 29 illustrates a threshold value matrix.

DESCRIPTION OF THE EMBODIMENTS

Various exemplary embodiments, features, and aspects of the invention will be described in detail below with reference to the drawings.

With reference to attached figures, the present invention will be described in detail herein below based on preferable exemplary embodiments thereof. Configurations described in the exemplary embodiments below are just examples, and thus the present invention is not limited to the illustrated configurations.

Figure 1:
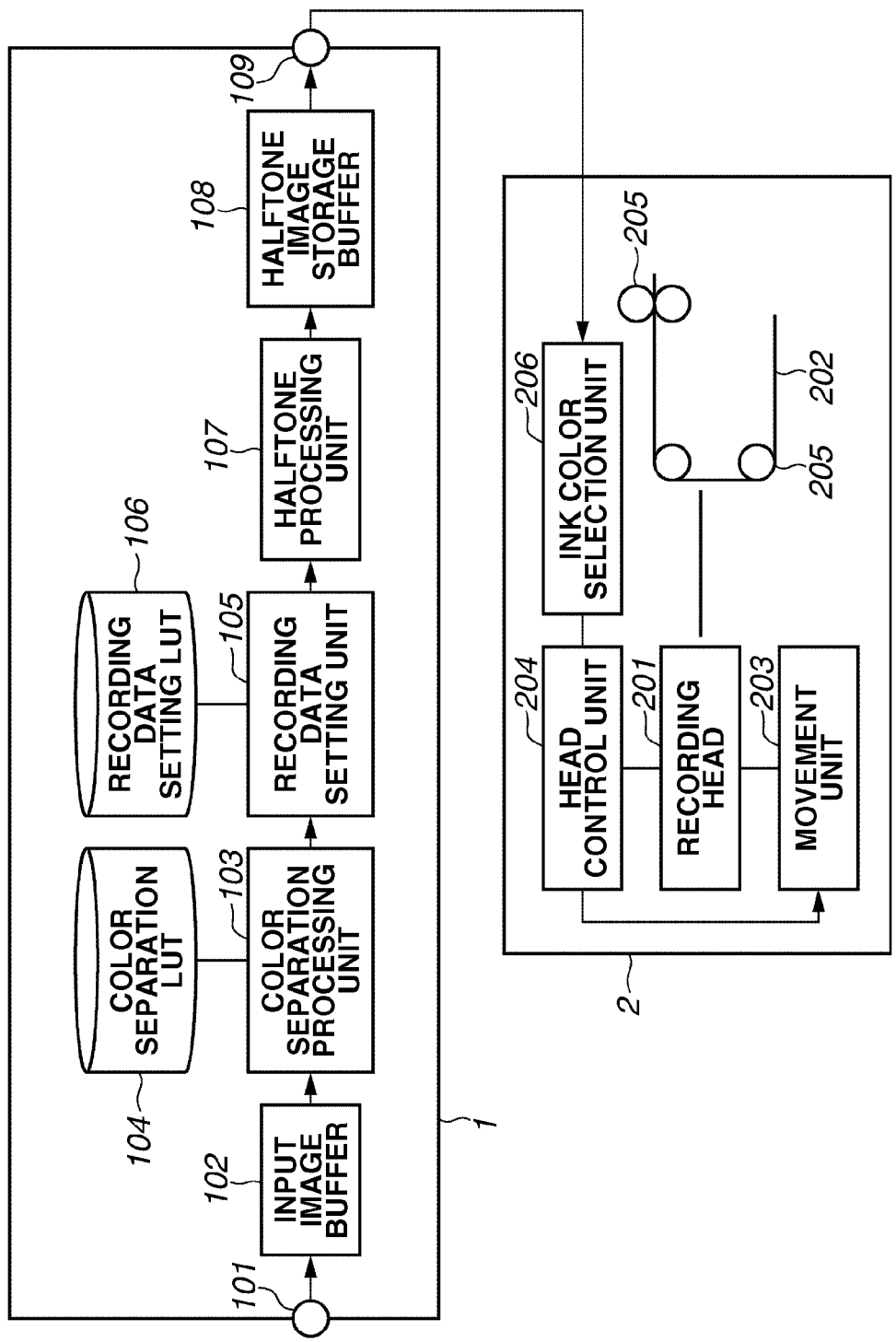
FIG. 1 is a block diagram illustrating a configuration of an image processing apparatus and an image forming apparatus.

FIG. 1 is a bock diagram illustrating a configuration of an image processing apparatus and an image forming apparatus that can be applied in a first exemplary embodiment. In FIG. 1, an image processing apparatus 1 and an image forming apparatus 2 are connected to each other via an interface or a circuit. The image processing apparatus 1 is, for example, a printer driver installed in a general PC. In such a case, each unit included in the image processing apparatus 1 described below can be realized when the PC executes a predetermined program. The image forming apparatus 2 may include the image processing apparatus 1.

The image processing apparatus 1 stores in an input image buffer 102 print target color image data (hereafter, referred to as "color input image data") that is input via an input terminal 101. The color input image data includes three color components including red (R), green (R), and blue (B).

A color resolution processing unit 103 separates the stored color input image data into the image data corresponding to a color of a color material provided in the image forming apparatus 2. To perform the color separation, a color resolution look up table (LUT) 104 is referred to. The colors of the color materials according to the present exemplary embodiment include six colors of light cyan (Lc) and light magenta (Lm) that have relatively low ink density, and four colors of cyan (C), magenta (M), yellow (Y), and black (B).

Based on a recording data setting LUT 106, a recording data setting unit 105 further converts the image data corresponding to each color of the color materials acquired from the color resolution processing unit 103 into the recording data for each scanning. The recording data according to the present exemplary embodiment indicates an amount of ink used for printing in scanning.

A halftone processing unit 107 binarizes the recording data for each color and for each scanning acquired by the recording data setting unit 105 by a dither method, and then outputs binary data (hereafter, referred to as "halftone image data"). The halftone processing unit 107 outputs the halftone image data for each color and for each scanning to a halftone image storage buffer 108. The stored halftone image data is output to the image forming apparatus 2 via an output terminal 109.

Based on the halftone image data of each color received from the image processing apparatus 1, the image forming apparatus 2 moves a recording head 201 relatively vertically and horizontally with respect to a recording medium 202 to form the image on a recording medium. The recording head 201 employs an inkjet method and includes one or more recording elements (nozzles). A head control unit 204 controls a movement unit 203 to move the recording head 201. Further, a conveyance unit 205 conveys the recording medium under control of the head control unit 204.

Based on the halftone image data for each scanning corresponding to each color formed by the image processing apparatus 1, an ink-color selection unit 206 selects ink corresponding to the halftone image data to be printed, from among ink mounted in the recording head 201.

Figure 2:
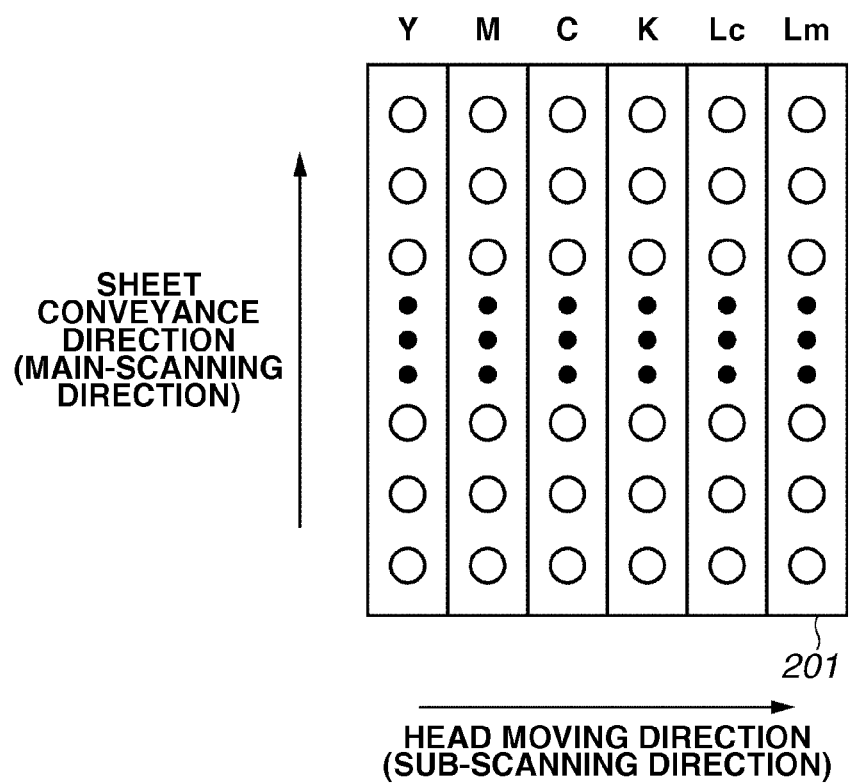
FIG. 2 illustrates a configuration of a recording head.

FIG. 2 illustrates a configuration example of the recording head 201. According to the present exemplary embodiment as described above, the ink of the six colors including the light cyan (Lc) and the light magenta (Lm) that have relatively low ink density, and the four colors of cyan (C), magenta (M), yellow (Y), and black (K) is mounted in the recording head 201.

In the present exemplary embodiment, for the sake of simplicity, nozzles are arranged in one array in a direction where a recording medium is conveyed (main-scanning direction), however, the number of nozzles and the arrangement thereof are not limited to the above-described example. For example, the nozzles for the ink of the same density and same color, however, different ink discharge amounts may be provided, or the nozzles for a same amount of the ink discharge may be arranged in a plurality of arrays. Further, the nozzles may be arranged in a zig-zag manner. Furthermore, in FIG. 2, an order of the nozzles for each ink color is arranged on one line in a sub-scanning direction, however, it may be arranged in one array in the main-scanning direction.

Figure 3:
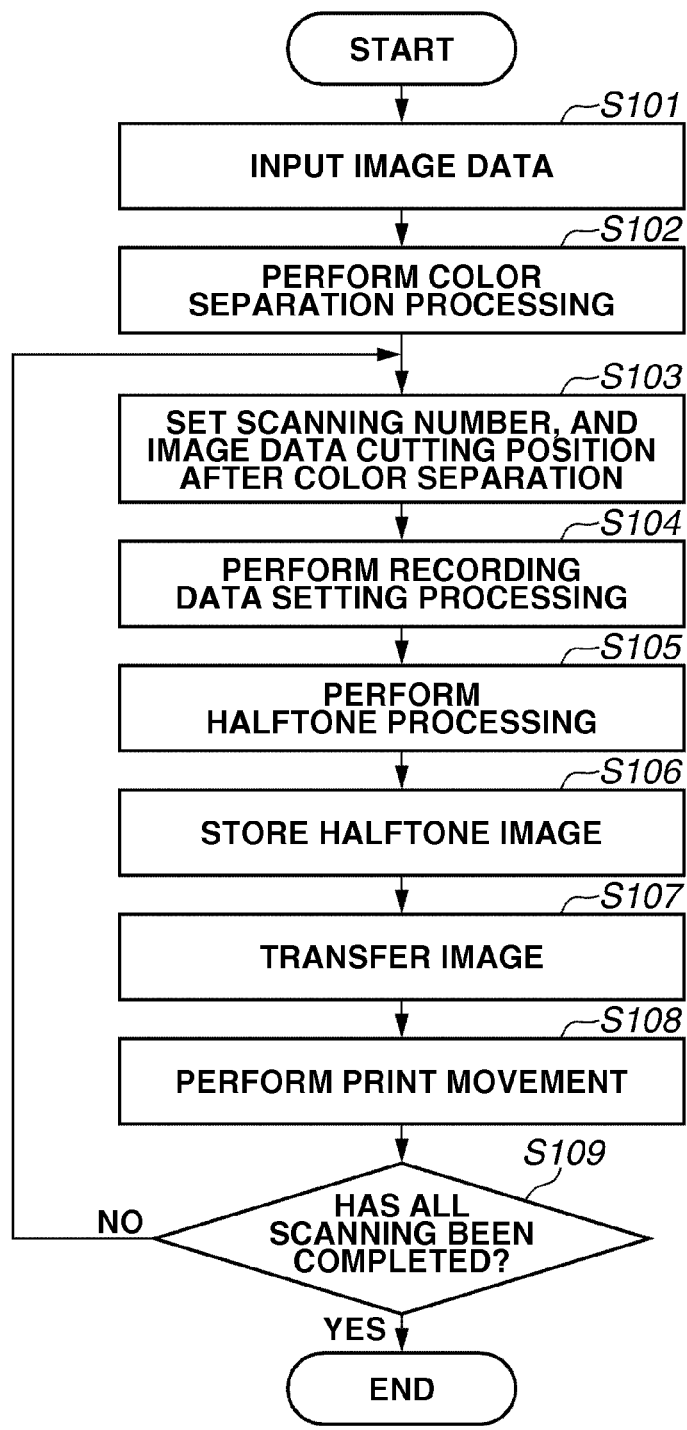
FIG. 3 illustrates a flow of image processing performed by the image processing apparatus.

Processing performed by the image processing apparatus 1 and the image forming apparatus 2 that can be applied to the present exemplary embodiment including the above-described functional configurations will be described, with reference to a flowchart illustrated in FIG. 3. In S101, multi-level color input image data is input via the input terminal 101, and stored in an input image buffer 102. The input image data herein generates the color input image data from the three color components of red (R), green (G), and blue (B).

In step S102, a color resolution processing unit 103 separates RGB of the color input image data into each color of CMYK and LcLm thereof using the color resolution LUT 104. According to the present exemplary embodiment, each color-separated pixel data is dealt as 8-bit data, however, it may be converted to have more number of gradations than 8 bits.

As described above, the recording head 201 according to the present exemplary embodiment includes the ink of the six colors. Thus, the color input image data of RGB is converted into the image data including six planes of CMYKLcLm.

Figure 4:
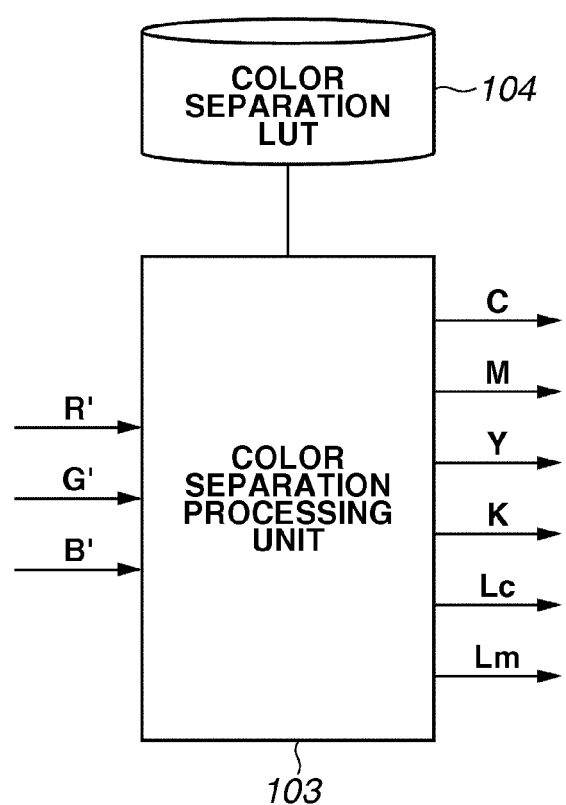
FIG. 4 illustrates a color resolution processing unit.

FIG. 4 illustrates input and output of the data performed by the color resolution processing unit 103. The input image data of each color of R', G', and B' is converted into the color-separated image data corresponding to each color of CMYKLcLm, as described in the following equations with reference to the color resolution LUT 104.

$$C = C\_LUT\_3D(R', G', B') \quad (1)$$

$$M = M\_LUT\_3D(R', G', B') \quad (2)$$

$$Y = Y\_LUT\_3D(R', G', B') \quad (3)$$

$$K = K\_LUT\_3D(R', G', B') \quad (4)$$

$$Lc = Lc\_LUT\_3D(R', G', B') \quad (5)$$

$$Lm = Lm\_LUT\_3D(R', G', B') \quad (6)$$

Each function defined on right sides of the equations (1) to (6) corresponds to content of the color resolution LUT 104. The color resolution LUT 104 defines output values of ink from three input values of red, green, and blue. According to the present exemplary embodiment, since the ink of the six colors of CMYKLcLm is provided, six output values are acquired from the three input values according to the LUT.

With the above-described processing, the color resolution processing according to the present exemplary embodiment is completed.

Insteps S103 to S109 described below, the processing is performed for each color. A case of cyan (C) will be described herein as an example. The same processing is performed on other five colors of the color materials of magenta (M), yellow (Y), black (K), light cyan (Lc), and light magenta (Lm).

In step S103, the recording data setting unit 105 sets a scanning number (k) and Ycut (k) indicating a (Y) coordinate as a image data cutting position after color separation. The Ycut (k) is the image data cutting position after color separation for the scanning number (k) and corresponds to a coordinate of a top end of a nozzle array. An initial value of the scanning number (k) is 1, and incremented by 1 after each processing loop.

A method for setting the (Y) coordinate of the image data cutting position after color separation, Ycut (k), will be described, using, as an example, a case where an array including sixteen nozzles is provided and four-pass printing is performed to form the image by four-time-scanning on the same main-scanning recording region on the image.

Figure 5:
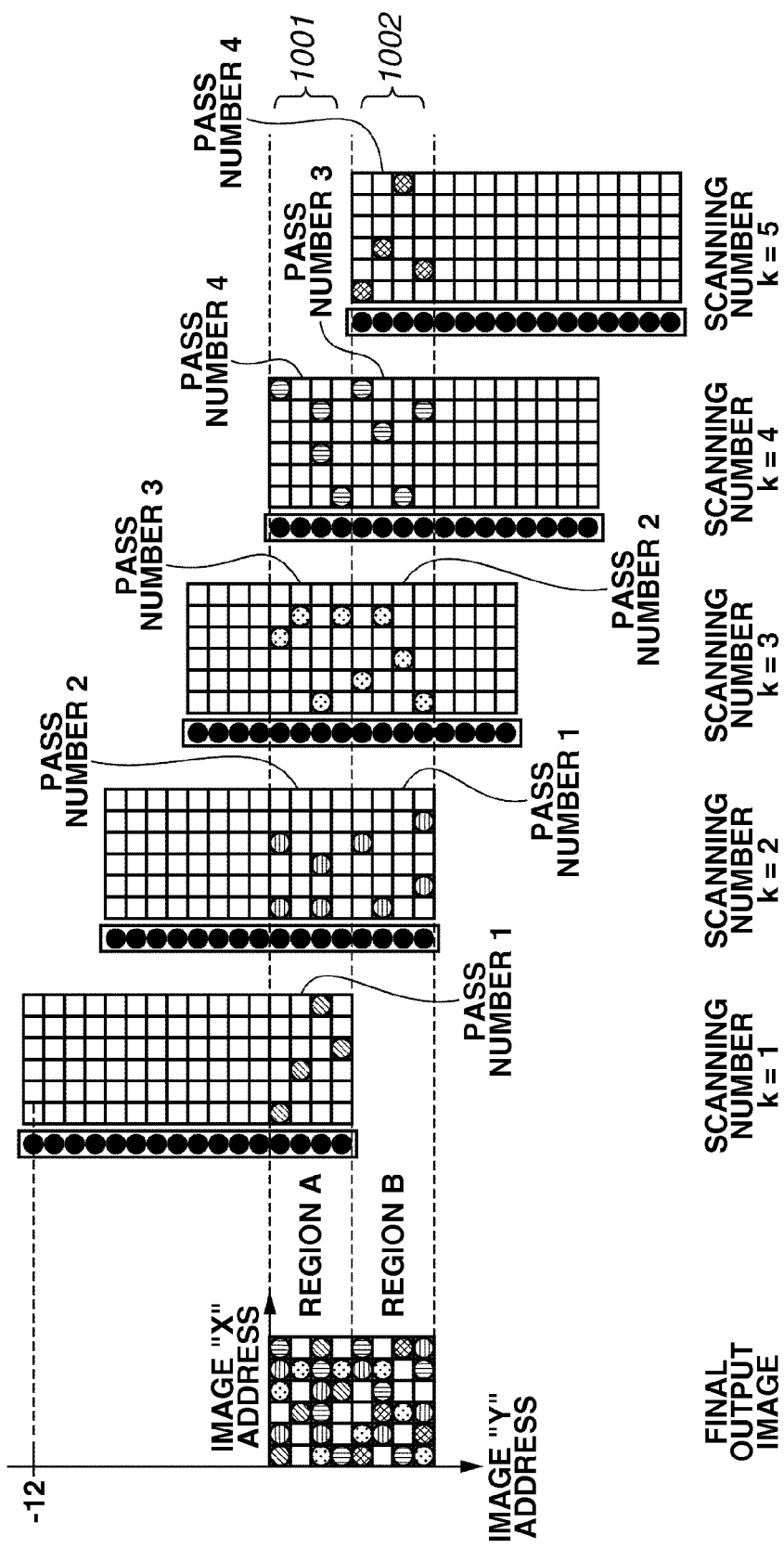
FIG. 5 illustrates a relationship between a head and a region where an image is formed, corresponding to a scanning number.

In general, when the four-pass printing is performed, as illustrated in FIG. 5, when the initial value of the scanning number (k) is 1, the image is formed using only one fourth of the nozzle array, which is the bottom end portion thereof. When the scanning number (k) is 2, paper is fed by one fourth of the length of the nozzle array from a position of the paper when the scanning number (k) is 1, and then the image is formed. Further, when the scanning number (k) is 3, the paper is fed by one fourth of the length of the nozzle array from the position of the paper when the scanning number (k) is 2, and then the image is formed. Such image formation and paper feeding are repeatedly performed to form a final output image. Therefore, when the scanning number (k) is 1, the image data cutting position after color separation, Ycut corresponding to the coordinate at the top end of the nozzle array is −12.

When the image data cutting position after color separation, Ycut (k) is generalized, the number of the nozzle arrays: Nzzl, the number of the passes: Pass, and the scanning number: k is given in the following equation.

$$Ycut(k) = -Nzzl + (Nzzl/Pass) \times k \quad (7)$$

When Ycut (k) is set as described above, in step S104, the recording data setting unit 105 sets the recording data for each scanning using the recording data setting LUT 106, based on the color-separated image data corresponding to each color.

Figure 6:
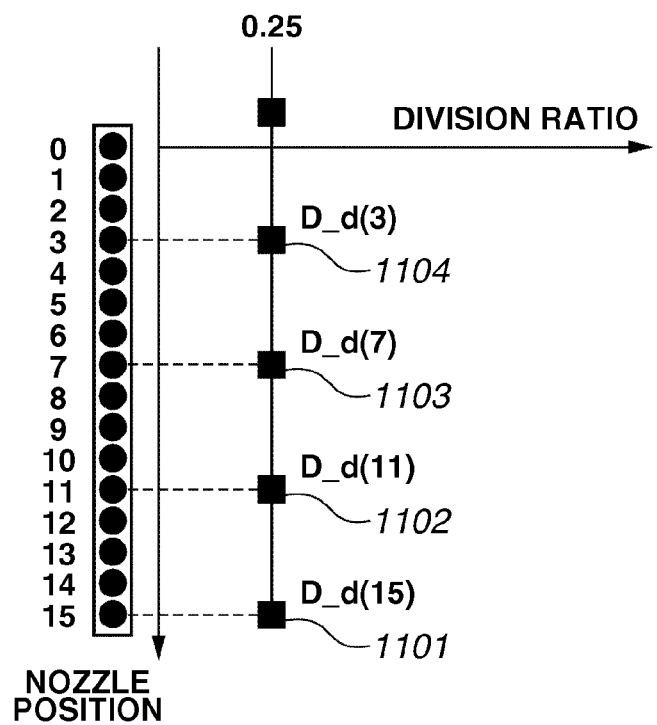
FIG. 6 illustrates a recording data setting LUT.

According to the recording data setting LUT 106, when the four-pass printing is performed, values illustrated in FIG. 6 are given. FIG. 6 illustrates an exemplary case of using sixteen nozzles and four passes, and a vertical axis indicates a nozzle position and a horizontal axis indicates a duty division ratio. The nozzle positions 3, 7, 11, and 15 are set for every four nozzles, and the duty division ratio for the sixteen nozzles acquired by performing linear interpolation among the four nozzle positions is held as the recording data setting LUT 106. The ratio for dividing the color-separated image data to each scanning is referred to as a "division ratio".

FIG. 6 indicates that, when the division ratio of the color-separated image data corresponding to cyan is defined as D_d, D_d(3)=D_d(7)=D_d(11)=D_d(15)=0.25 is acquired. In other words, the color-separated image data is evenly divided at a ratio of ¼=0.25 for each scanning. A function for a nozzle position ny at a ratio of D_d is described as below.

$$D\_d(ny) = 0.25 \quad (8)$$

$$(0 \leq ny < Nzzl)$$

Numeral values of the division ratio D_d(3), a point D_d(7), a point D_d(11), and a point D_d(15) are set as below.

$$D\_d(3) + D\_d(7) + D\_d(11) + D\_d(15) = 1.0 \quad (9)$$

Further, the values to be held as the recording data setting LUT 106 are not limited by the above-described setting method, but may be changed with the values of the top end portion and bottom end portion of the nozzle array. Furthermore, more points may be set, and the point may be directly specified for each nozzle.

Figure 7:
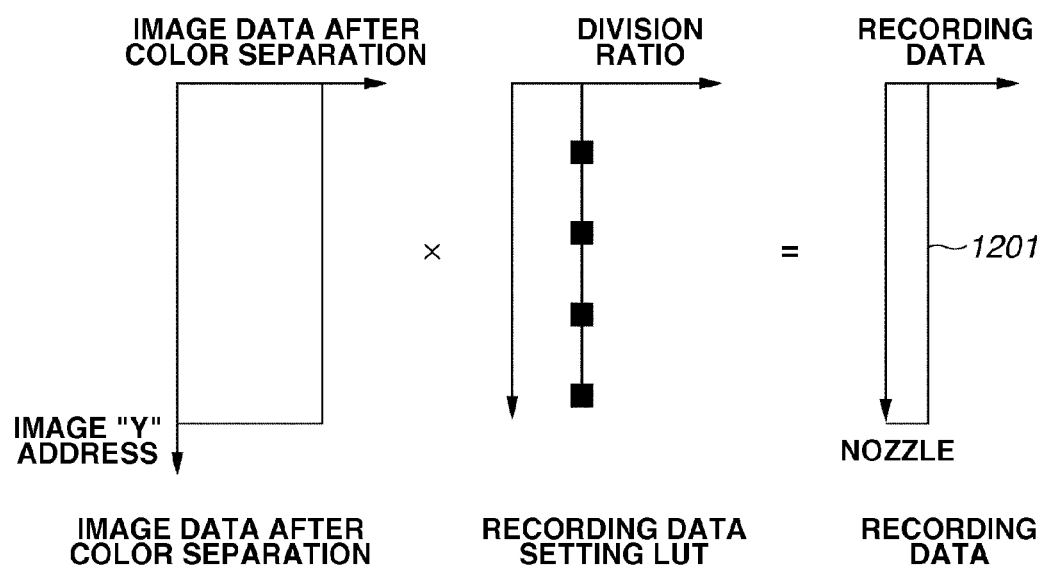
FIG. 7 illustrates processing for setting recording data.

In step S104, as illustrated in FIG. 7, the recording data setting unit 105 multiplies the recording data setting LUT 106 by the color-separated image data to set recording data. In other words, on the right side illustrated in FIG. 7, the recording data is actually set for each nozzle. With this arrangement, when scanning is performed, each nozzle discharges an amount of the ink based on the recording data to form the image.

Figure 8:
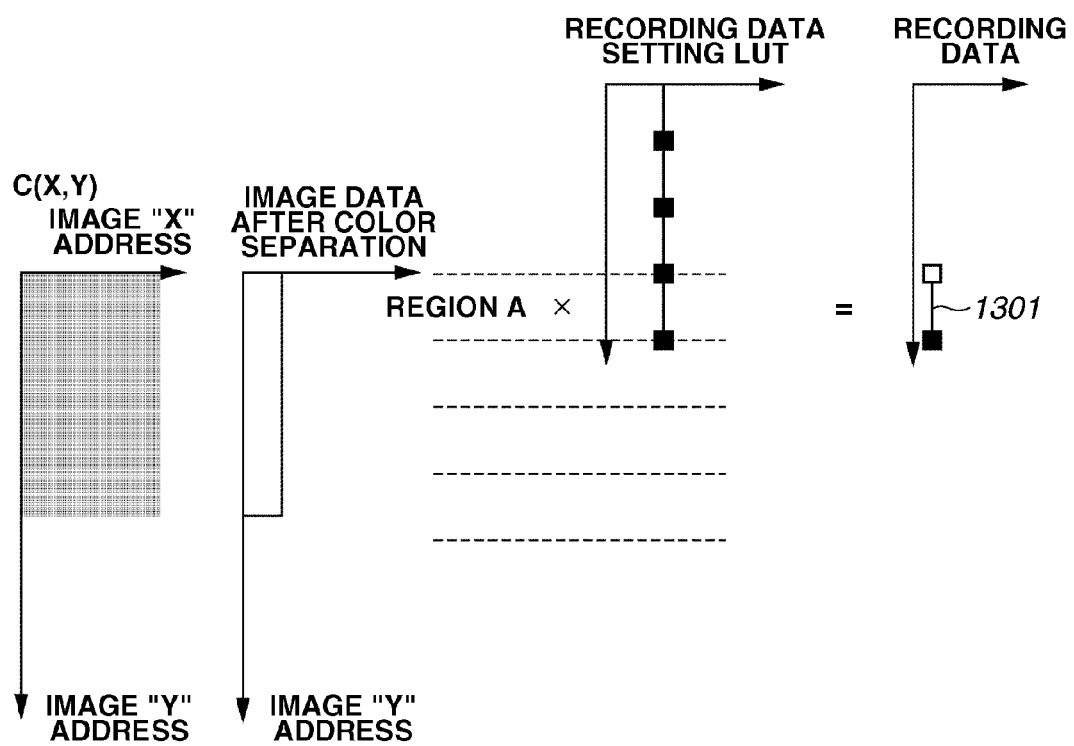
FIG. 8 illustrates a case where a corresponding nozzle is located at a coordinate outside a region of an image (Y) address.

When the nozzle is located outside a region of an image (Y) address, the recording data is set to 0. For example, as illustrated in FIG. 8, when the scanning number (k) is 1, since the image (Y) address is negative in the top end portion, three fourths, of the nozzle array, the scanning duty value 0 is substituted. Then, a significant value is substituted into the bottom end portion, the one fourths, of the nozzle array indicated with 1301.

Figure 9:
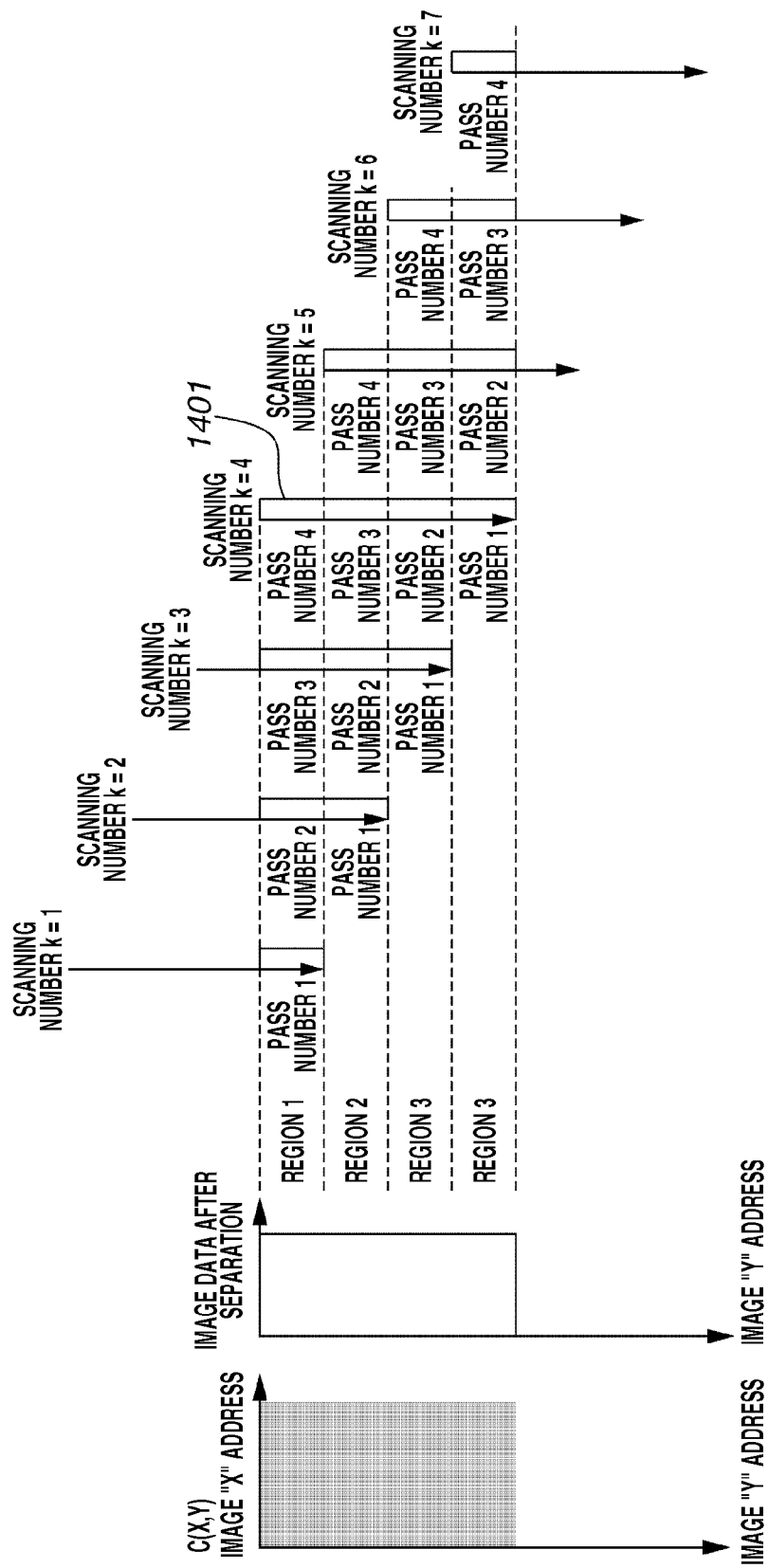
FIG. 9 illustrates a color resolution data cutting position Ycut (k) according to a scanning number.

Further, the image data cutting position after color separation, Ycut (k), is determined by the scanning number (k). When the scanning number (k) is 1 to 7, the recording data of each scanning is determined as illustrated in FIG. 9. FIG. 9 illustrates the recording data at the nozzle position corresponding to each scanning number, and the recording data varies depending on the scanning number.

The recording data is determined by product of the color-separated image data and the recording data setting LUT 106. Accordingly, if the LUT is multiplied while the paper is being fed, in a region 1 (1401), a total value for one raster formed by four-time-scanning for the scanning numbers (k) of 1 to 4 is the same as the color-separated image data. Similarly, in the regions 2, 3, and 4, the total value for one raster is the same as the color-separated image data.

Subsequently, in step S105, the halftone processing unit 107 performs the halftone processing for converting recording data into the binary data.

The halftone processing according to the present exemplary embodiment uses the dither method as the processing for converting the recording data (8 bits) expressed in 256 gradations into two gradations. The details of the processing will be described below.

In step S107, band data stored in the halftone image storage buffer 108 whose vertical direction corresponds to the number of nozzles (Nzzl) and horizontal direction corresponds to an (X) size (W) of the image is output via the output terminal 109.

In step S108, the image forming apparatus 2 that has received the halftone image data selects the ink color matching the halftone image data, and then starts a print operation.

In step S109, as the recording head 201 moves from left to right with respect to the recording medium, the main scanning is performed once by driving each nozzle at a certain driving interval and recording the image on the recording medium. Further, upon completion of the main scanning, the sub scanning in a vertical direction to the main scanning is performed once.

Further, in step S109, it is determined whether all scanning has been completed. When it has been completed (YES in step S109), a series of image forming processing is completed. When it has not been completed (NO in step S109), the processing returns to step S103. After the steps described above, the whole processing ends.

Figure 10:
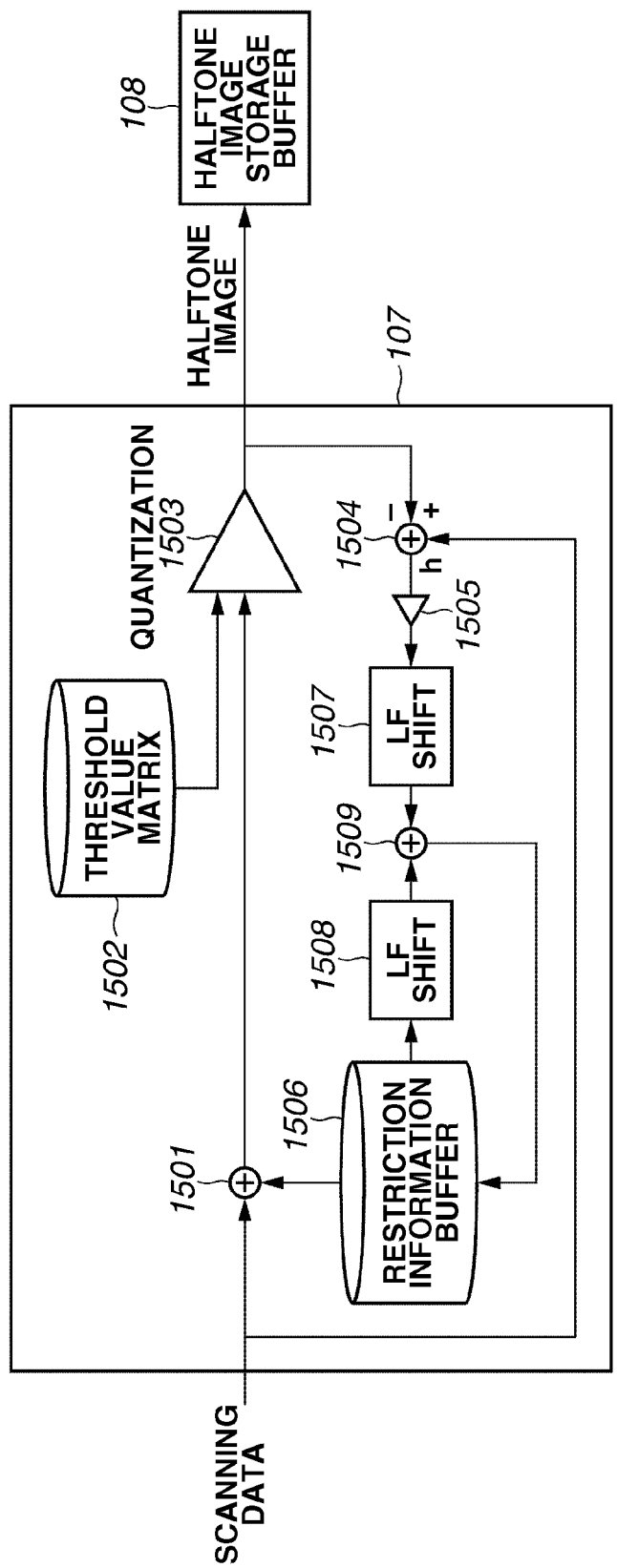
FIG. 10 is a block diagram illustrating a configuration of a halftone processing unit.
Figure 11:
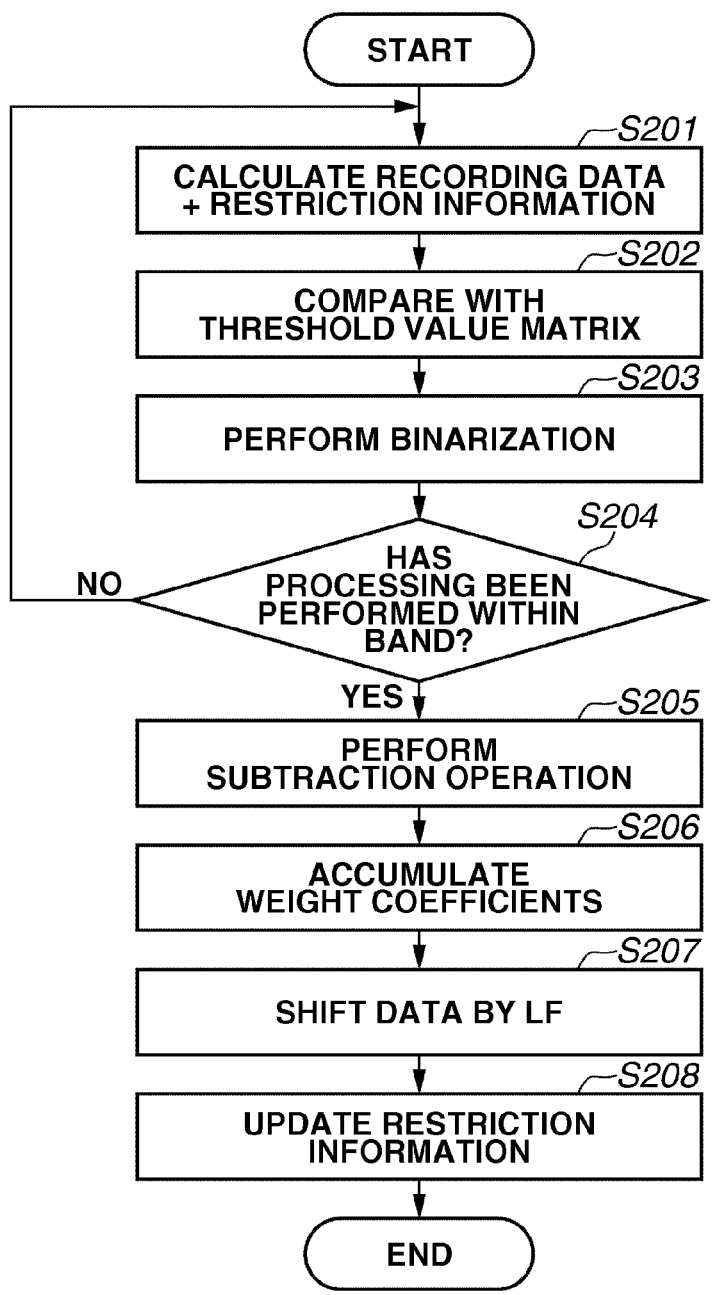
FIG. 11 is a flowchart illustrating processing performed by the halftone processing unit.

The halftone processing performed in step S105 will be described in detail. For the sake of simplicity, a case will be described, as an example, where the halftone processing is performed on the recording data by the four-pass printing when the scanning number (k) for cyan is 1. FIG. 10 illustrates a configuration of the halftone processing unit 107. FIG. 11 is a flowchart illustrating a flow of the halftone processing performed by the halftone processing unit 107.

In step S201 illustrated in FIG. 11, as described in the following equation, the restriction information addition unit 1501 illustrated in FIG. 10 calculates total data Ic of C_d that is cyan recording data and restriction information C_r stored in a restriction information buffer 1506. All restriction information C_r when the scanning number (k) is 1 takes a value of 0.

$$Ic = C\_d + C\_r \quad (10)$$

Figure 12:
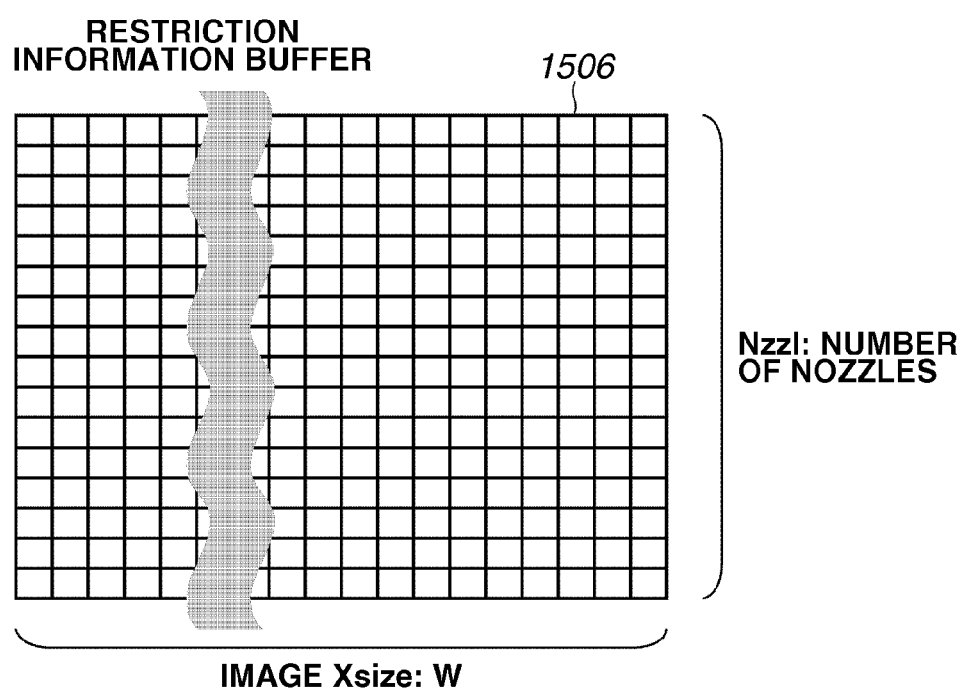
FIG. 12 illustrates a restriction information buffer.

The restriction information buffer 1506 illustrated in FIG. 12 holds the restriction information in a band-like shape corresponding to the number of the nozzles in the vertical direction and an image (x) size in the horizontal direction. Further, the restriction information buffer 1506 stores the restriction information for each color. The restriction information contains a value of whether a dot is easily formed on an address (pixel) on the image to be recorded, and is updated for each scanning number (k).

In a case where the scanning number (k) is 1 when the processing is started, 0 is substituted into all initial values. More specifically, when the restriction information about respective colors at the address of (X, Y) is defined as C_r(X, Y), Lc_r(X, Y), M_r(X, Y), Lm_r(X, Y), Y_r(X, Y), and K_r(X, Y) when the scanning number (k) is 1, the restriction information is described as below. (0≤nx<image (x) size, and 0≤ny<Nzzl (the number of the nozzle arrays: sixteen in this case))

$$C\_r(nx,ny) = 0 \quad (11)$$

$$Lc\_r(nx,ny) = 0 \quad (12)$$

$$M\_r(nx,ny) = 0 \quad (13)$$

$$Lm\_r(nx,ny) = 0 \quad (14)$$

$$Y\_r(nx,ny) = 0 \quad (15)$$

$$K\_r(nx,ny) = 0 \quad (16)$$

Therefore, substantially, when the scanning number (k) is 2 or more, the restriction information buffer 1506 is updated to significant restriction information. The smaller the value of the significant information, the harder the dot is formed at the address and, the larger the value, the easier the dot is formed. More specifically, when forming the dot at the address is easy, a positive value is stored, and when forming the dot there is difficult, a negative value is stored. Updating the restriction information will be described in detail below.

Figure 13:
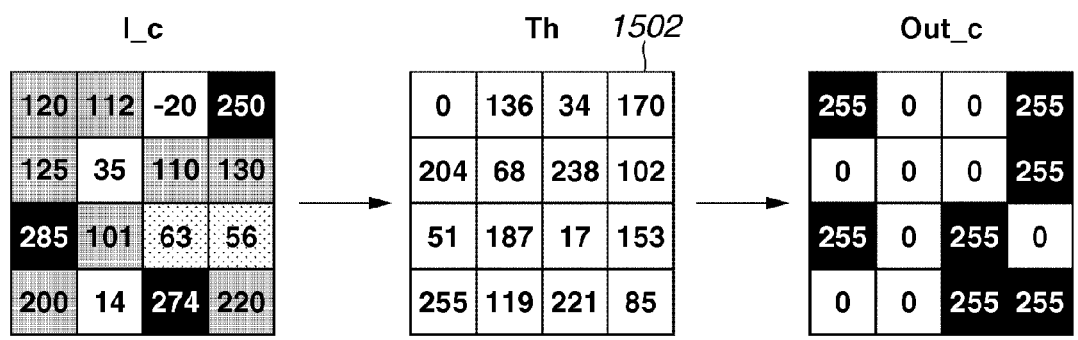
FIG. 13 illustrates a threshold value matrix and halftone image data.

In step S202, the quantization unit 1503 quantizes total value data I_c acquired by adding the restriction information to the recording data. FIG. 13 illustrates an outline of quantization performed by the quantization unit 1503. The quantization unit 1503 performs the quantization using a threshold value matrix 1502. The threshold value matrix 1502 includes a threshold value corresponding to each address (pixel) constituting the total value data. The quantization unit 1503 compares the total data with the threshold value matrix 1502 for each pixel and then, in step S203, the quantization unit 1503 outputs binary image data. The binarization at this point is expressed as below using a threshold value Th (0 to 255) in the threshold value matrix 1502.

$$(\text{When } \text{``}I\_c < Th\text{''}) \text{Out\_c} = 0 \quad (17)$$

$$(\text{When } \text{``}Th \leq I\_c\text{''}) \text{Out\_c} = 255 \quad (18)$$

The output value Out_c is a final output value from the halftone processing unit 107 and a halftone pixel value included in the halftone image data. In the threshold value matrix 1502 according to the present exemplary embodiment, the threshold value is arranged to have the blue noise characteristic. Further, according to the present exemplary embodiment, the quantization unit 1503 uses the same threshold value matrix 1502 for each scanning number.

In step S204, the processing in steps S201 to S203 described above is performed at the addresses of (0, 0) to (W−1, Nzz−1) within the band. When the processing is carried out, the halftone pixel values expressing all addresses (pixels) are determined and the halftone image data is generated. Dot layout formed by record-scanning is determined herein.

Figure 14:
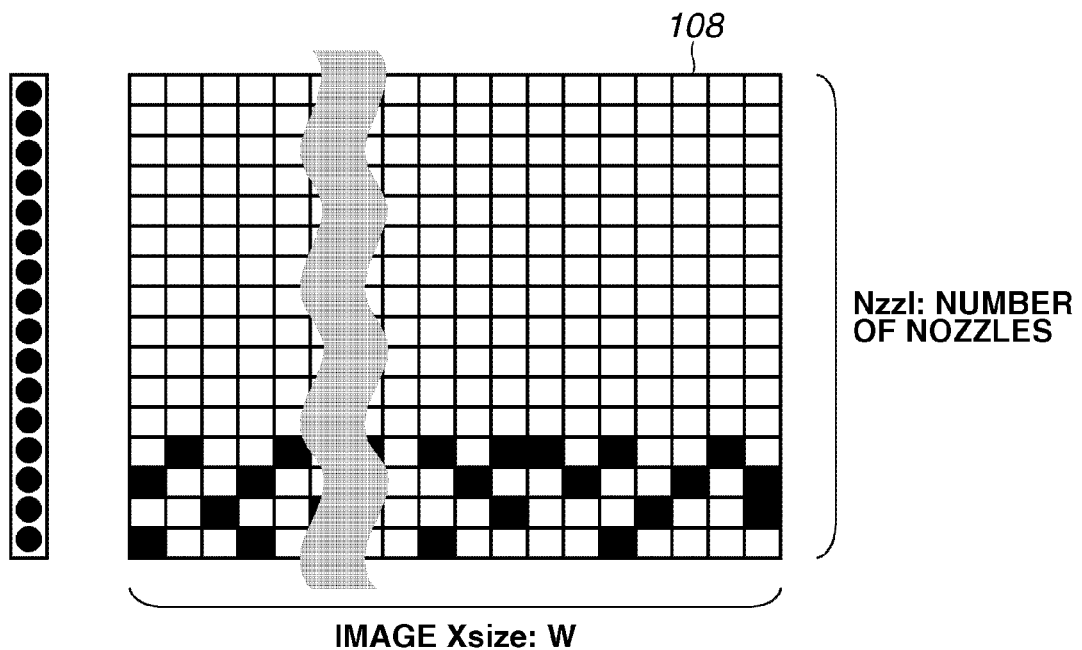
FIG. 14 illustrates a halftone image storage buffer.
Figure 16A:
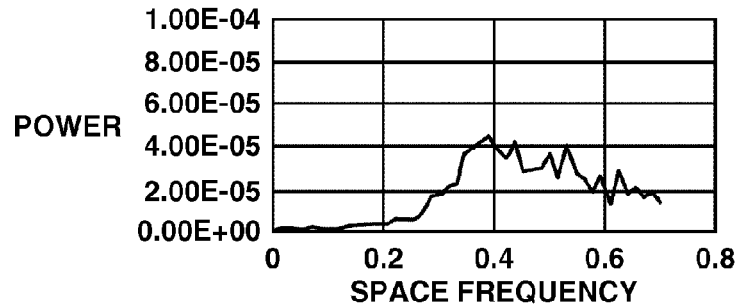
FIGS. 16A, 16B, 16C, and 16D illustrate frequency characteristics of patterns in which halftone images are accumulated according to a first exemplary embodiment.
Figure 16B:
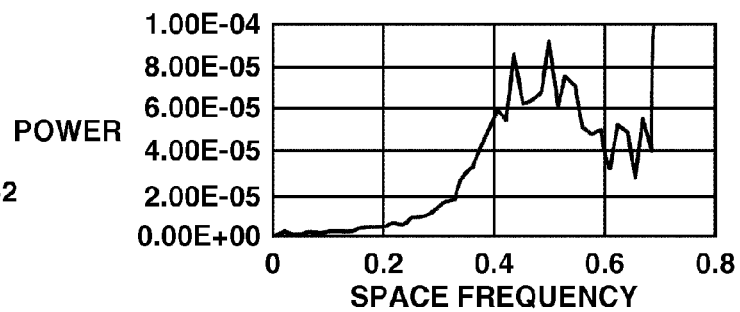
Figure 16C:
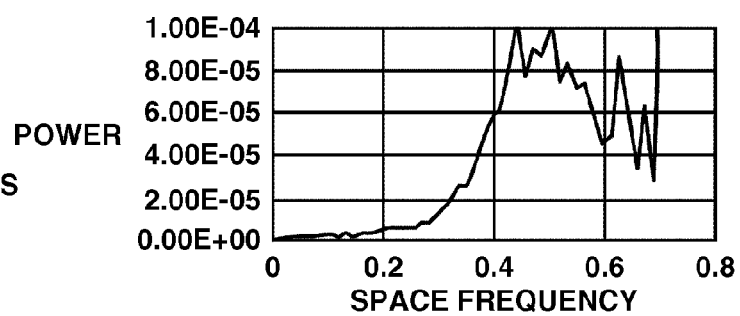
Figure 16D:
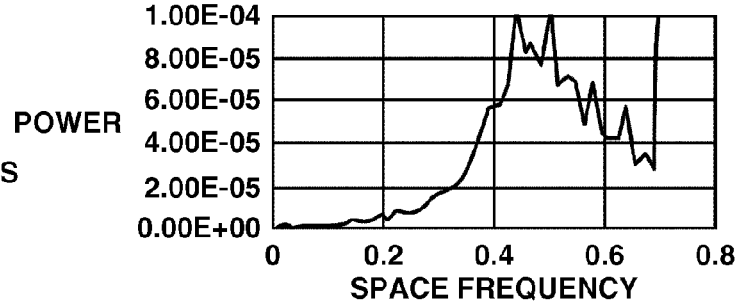

In step S204, the halftone processing when the scanning number (k) takes a value 1, is completed. As a result of the processing, the halftone image data formed by one record-scanning for each color component is stored in the halftone image storage buffer 108 of each color component. FIG. 14 illustrates the halftone image data when the scanning number (k) is 1. The halftone image data is stored in the halftone image storage buffer 108.

In step S205, a subtraction unit 1504 subtracts the halftone image data Out_c from the recording data C_d.

In step S206, a weight multiplication unit 1505 multiplies data acquired from the subtraction unit 1504 by a weight coefficient (h) (actual number). According to the present exemplary embodiment, (h) is set to 1.0.

$$S(nx,ny) = (-\text{Out}\_c + C\_d) \times h \quad (19)$$

In step S207, an LF shift unit 1507 shifts the data calculated by the weight multiplication unit 605 by LF, which is a paper feeding amount. Further, an LF shift unit 1508 shifts restriction information C_r(nx, ny) stored in the restriction information buffer 1506 by LF.

In step S208, an addition unit 1509 adds the shifted restriction information C_r(nx, ny+LF) when the scanning number (k) is 1, to the shifted S (nx, ny+LF) to update the restriction information C_r.

$$C\_r(nx,ny) \leftarrow C\_r(nx,ny+LF) + S(nx,ny+LF) \quad (20)$$

When "ny+LF≥zzl", C_r(nx, ny)=0 In other words, 0 is substituted into the restriction information for the LF nozzles at the bottom end portion of the nozzles after being shifted.

The restriction information C_r calculated herein is used when the halftone processing is performed on the recording data corresponding to the scanning number (k) of 2 that follows the scanning number (k) of 1. In other words, the restriction information generated based on the halftone image data when the scanning number (k) takes a value (m) is stored in the restriction information buffer 1506 as the restriction information to be used when the halftone processing is performed on the recording data corresponding to the scanning number (k) of m+1.

According to the present exemplary embodiment, the values of the restriction information are stored in the restriction information buffer 1506 such that an average value thereof is 0 at any timing of the scanning number, however, other restriction information may be also stored.

A reason for shifting the data by the paper feeding amount of LF is that the halftone image data formed at the next scanning number is relatively shifted by the paper feeding amount of LF on the recording medium.

After the processing described above, the halftone processing when the scanning number (k) takes a value of 1 is completed. As a result, the halftone image data formed by one record-scanning for each color component is stored in the halftone image storage buffer 108 for each color component.

The restriction information will be described in detail based on equations (19) and (20) indicating an update method thereof. The Out_c in the equation (19) is the halftone image data when the scanning number (k) is (m). A minus symbol is applied to the halftone image data to make −Out_c, which is subtracted from the restriction information before being updated. The restriction information from which the halftone image data when the scanning number (k) takes a value (m) is subtracted is used for the halftone processing performed on the recording data when the scanning number (k) takes a value m+1. It becomes difficult to form the dots when the scanning number (k) takes a value m+1, at the address (pixel) where the dot is formed when the scanning number (k) takes a value (m).

The dot layout arranged by the above-described processing will be described using, as an example, a case where 512 nozzles and four passes are used. FIG. 15 illustrates the dot layout when the record-scanning for the scanning numbers 1 to 4 is performed in a region 1 illustrated in FIG. 9.

FIG. 15A illustrates the dot layout (pass number 1) acquired by performing printing on the region 1 by record-scanning of the scanning number 1. FIG. 15B illustrates the dot layout acquired by performing printing by record-scanning of the scanning numbers 1 and 2, where the pass numbers 1 and 2 are accumulated. Similarly, FIG. 15C illustrates the dot layout where the pass numbers 1, 2, and 3 are accumulated.

Further, FIG. 15D is the dot layout where the pass numbers 1, 2, 3, and 4 are accumulated. FIG. 15D illustrates the dot layout of the image to be finally formed. FIG. 15E illustrates the dot layout of only the pass number 2. FIG. 15F illustrates the dot layout of only the pass number 3. FIG. 15G illustrates the dot layout of only the pass number 4.

The dot layouts illustrated in FIGS. 15A to 15D are accumulated layouts in a process of forming the image by a plurality of scanning. FIGS. 16A to 16D illustrate a result of performing Fourier analysis on each of FIGS. 15A to 15D. Any accumulated dot layout has the blue noise characteristic. More specifically, according to the present exemplary embodiment, any accumulated dot layout has the blue noise characteristic, thereby having high dispersibility.

A reason for having the blue characteristic as described above is that the restriction information calculated in the equations (19) and (20) is used for the halftone processing as the restriction information of the data from which the formed halftone image data is subtracted as it is. In other words, in a case where (N)-pass printing is performed, when the halftone image is determined for a (p)th (2≤p≤N) pass in the same region (A) illustrated in FIG. 20, the dot pattern where the passes up to a (p−1)th pass are accumulated is used as the restriction information. Using the above-described restriction information, the (p)th halftone processing is performed.

As a result, the dots are formed in a region different from a region of the pattern where the passes up to the (p−1)th pass used as the restriction information are accumulated, and thus the dispersibility can be improved also in a process of accumulating the image. When the dispersibility is not taken into consideration in the dot layout where the passes are accumulated, in a process of forming the dots by the image forming apparatus performing the printing based on the halftone image data, coarse and thick portions are generated in the dot layout in the accumulated passes.

Thus, liquid drops interfere each other or their interactions occur. Accordingly, even if the dot layout for each pass has high dispersibility, the finally acquired granularity is deteriorated. According to the present exemplary embodiment, along with the process of forming the image, by taking into consideration the dispersibility of the accumulated dot layout to be printed, the image can be finally acquired, which has more preferable granularity.

According to the present exemplary embodiment, the restriction information is reflected on the recording data corresponding to each scanning, however the present invention is not limited to a method according to the present exemplary embodiment. As another method, the restriction information may be reflected on a dither matrix. When the dither matrix is used, the restriction information may have a larger threshold value of the dither matrix at a position where the dot is not to be formed.

Further, according to the present exemplary embodiment, when the four-pass printing is performed, by performing the halftone processing using the restriction information for the second to fourth passes, the accumulation patterns (passes 1 and 2, passes 1, 2, and 3, and passes 1, 2, 3, and 4) have the blue noise characteristic to improve the dispersibility. However, the dispersibility may not necessarily be improved in all accumulated images.

For example, since calculating the restriction information for all of the second to fourth passes increases processing cost, the dispersibility of the image where the passes 1, 2, and 3 are accumulated may not be taken into consideration. The halftone processing may be effectively performed when parts of the passes 1 and 2, and the passes 1, 2, 3, and 4 are accumulated so that the pass image acquires the high dispersibility.

According to the first exemplary embodiment, the halftone image data formed for each scanning is used for the dither processing as the restriction information. According to a second exemplary embodiment, a method will be described for realizing the equivalent method without using a restriction information buffer.

According to the second exemplary embodiment, since steps other than steps S104 and S105 perform the same processing as the first exemplary embodiment, only steps S104 and S105, which are characteristic features for the present exemplary embodiment, will be described.

In step S104, the recording data setting unit 105 converts each color-separated image data into the recording data based on the recording data setting LUT 106.

According to the present exemplary embodiment, similarly to the equations (8) and (9) according to the first exemplary embodiment, an ink-value division ratio of 0.25 is used as the division ratio of D_d of the color-separated image data. Further, in the present exemplary embodiment also, for the sake of simplicity, a case of cyan (C) will be described as an example.

Figure 17:
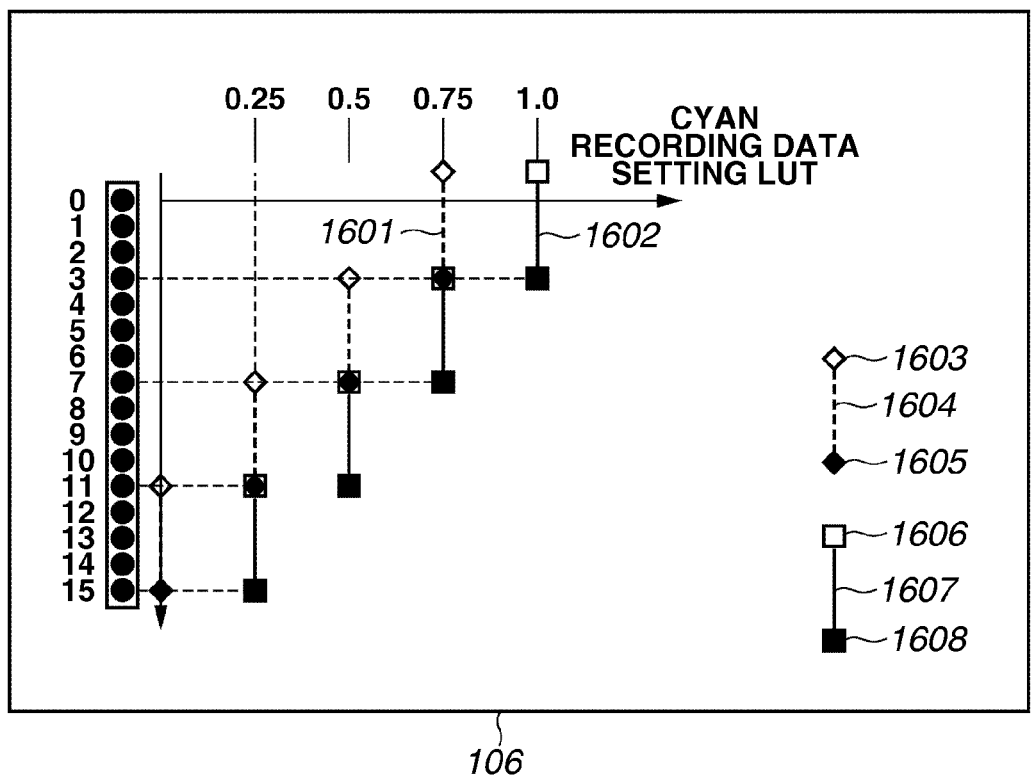
FIG. 17 illustrates a recording-data setting LUT.

When the division ratio of the above-described equations (8) and (9) are set, the recording data setting LUT 106 is set with respect to a relationship between the nozzle position and a setting value of the recording data as illustrated in FIG. 17.

FIG. 17 illustrates a recording data setting LUT, in which a vertical axis indicates a position of the nozzle and a horizontal axis indicates a value of the recording data setting LUT. Further, according to FIG. 17, for the recording data setting LUT of cyan, two kinds of LUTs, that is, a lower LUT (1601) and an upper LUT (1602) are set. The lower LUT is data indicated with a dashed line (1604), ◊ (1603), and ♦ (1605), and the upper LUT is data indicated with a solid line (1607), □ (1606), and ■ (1608). Furthermore, similarly, the recording data setting LUT is also set for other colors.

U_C_LUT(ny) that is the lower LUT of the recording data setting LUT 106 illustrated in FIG. 17 and O_C_LUT(ny) that is the upper LUT are generated according to rules described below.

$$U\_C\_LUT(ny) = D\_d(ny + Nzzl/4) + D\_d(ny + 2 \times Nzzl/4) + D\_d(ny + 3 \times Nzzl/4) \quad (21)$$

$$O\_C\_LUT(ny) = D\_d(ny) + D\_d(ny + Nzzl/4) + D\_d(ny + 2 \times Nzzl/4) + D\_d(ny + 3 \times Nzzl/4) \quad (22)$$

$$(0 \le nx < \text{imagexsize})(0 \le ny < Nzzl)$$

More specifically, the value of U_C_LUT that is the lower LUT of cyan is described as below.

(When "$0 \le ny < 4$") $U\_C\_LUT(ny) = 0.75$ (When "$4 \le ny < 8$") $U\_C\_LUT(ny) = 0.5$ (when $8 \le ny < 12$) $U\_C\_LUT(ny) = 0.25$ (When "$12 \le ny < 16$") $U\_C\_LUT(ny) = 0.0$ \quad (23)

The value of O_C_LUT that is the upper LUT of cyan is described as below.

(When "$0 \le ny < 4$") $O\_C\_LUT(ny) = 1.0$ (when "$4 \le ny < 8$") $O\_C\_LUT(ny) = 0.75$ (When "$8 \le ny < 12$") $O\_C\_LUT(ny) = 0.5$ (When "$12 \le ny < 16$") $O\_C\_LUT(ny) = 0.25$ \quad (24)

The values are similarly given to other colors. Using the above-described recording data setting LUT 106, the cyan recording data is set.

According to the present exemplary embodiment, as the cyan recording data, two kinds of recording data, that is, cyan lower recording data of U_C_d and cyan upper recording data of O_C_d are set. Based on the lower LUT of U_C_LUT and the upper LUT of O_C_LUT of the cyan recording data setting LUT 106, the two kinds of cyan recording data of U_C_d and O_C_d are calculated as described in the following equations.

$$U\_C\_d(nx,ny) = C\_d(nx, ny + Ycut(k)) \times U\_C\_LUT(ny) \quad (25)$$

$$O\_C\_d(nx,ny) = C\_d(nx, ny + Ycut(k)) \times O\_C\_LUT(ny) \quad (26)$$

Figure 18:
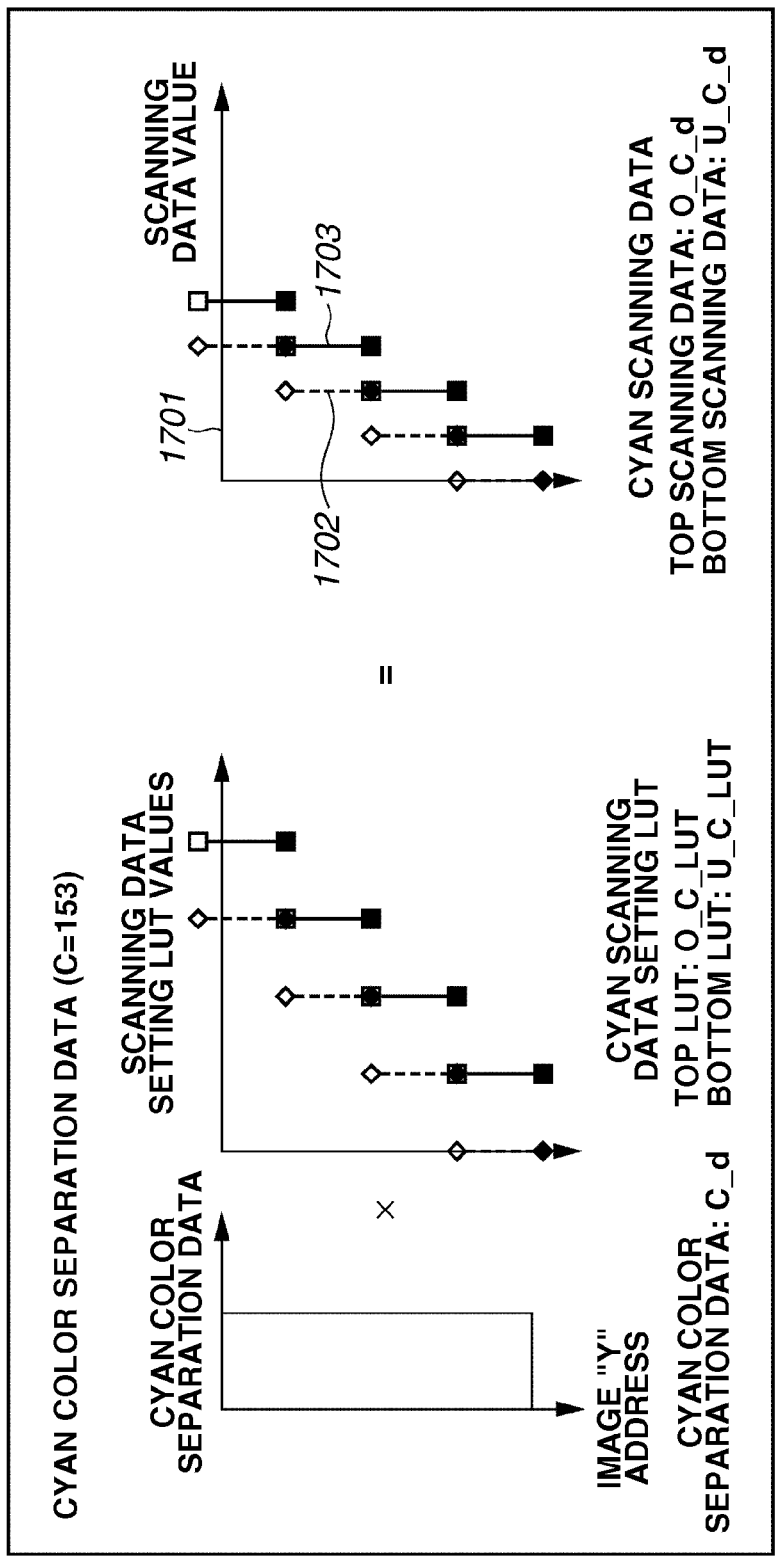
FIG. 18 illustrates recording-data setting processing.

A method for determining the recording data will be described with reference to FIG. 18. FIG. 18 illustrates a case where a cyan cover ratio is 60%, the color-separated image data C is 153 at all addresses (pixels).

The cyan recording data when the color resolution data is as illustrated in FIG. 18, is given as indicated with 1701. The lower recording data of U_C_d is indicated with 1702 and the upper recording data of O_C_d is indicated with 1703. For other colors, the calculation similar to the cyan recording data is performed.

Figure 19:
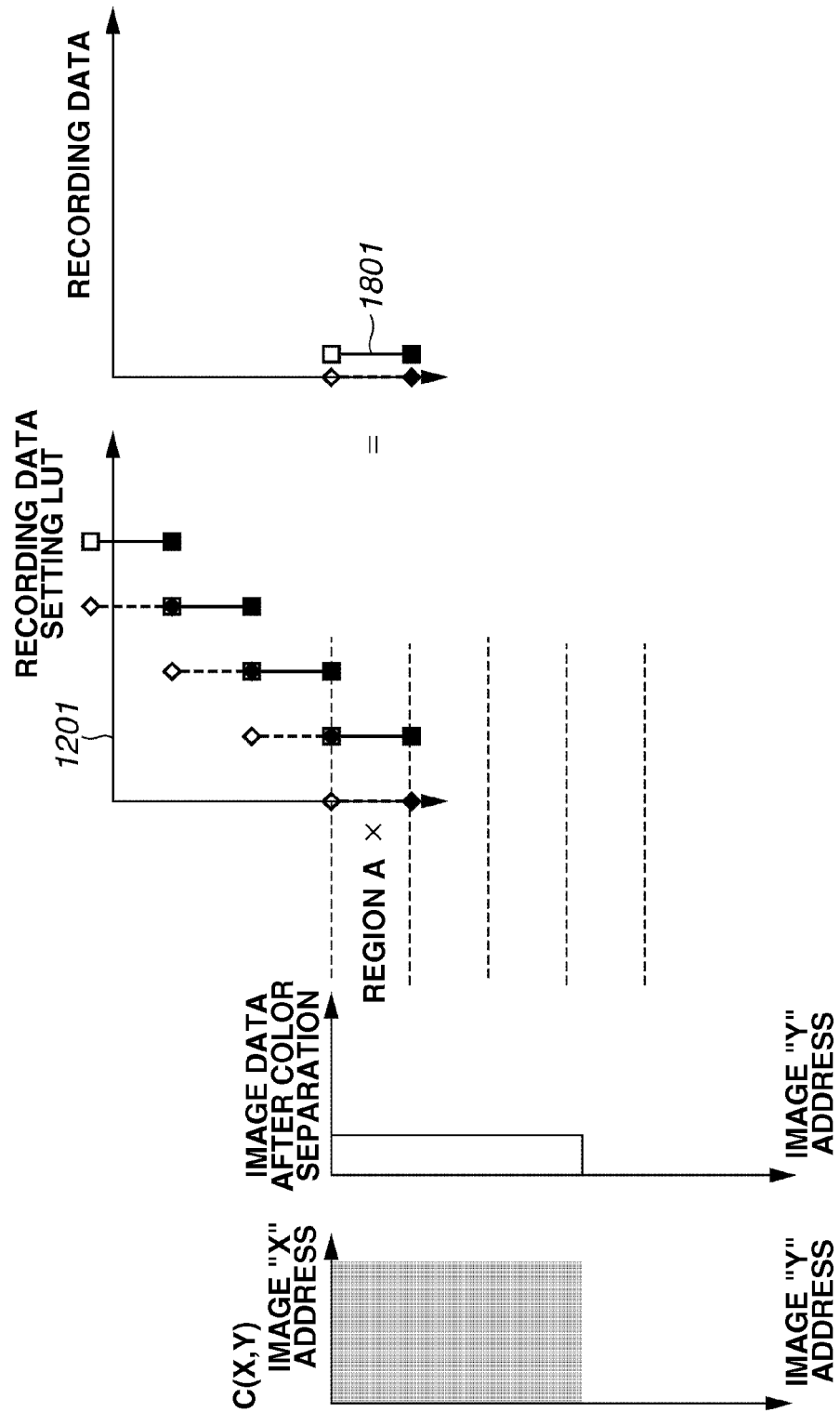
FIG. 19 illustrates a case where a corresponding nozzle is located at a coordinate outside a region of an image (Y) address.

According to the present exemplary embodiment, similarly to the first exemplary embodiment, when the corresponding nozzle is located at the coordinate outside the region of the image (Y) address, the recording data is set to 0. For example, when the scanning number (k) is 1, as indicated with 1801 illustrated in FIG. 19, since the image (Y) address is negative in the top end portion, three fourths, of the nozzle array, 0 is substituted into both of the upper recording data and the lower recording data, and then a significant value is substituted into the bottom end portion, the one fourth, of the nozzle array.

Figure 20:
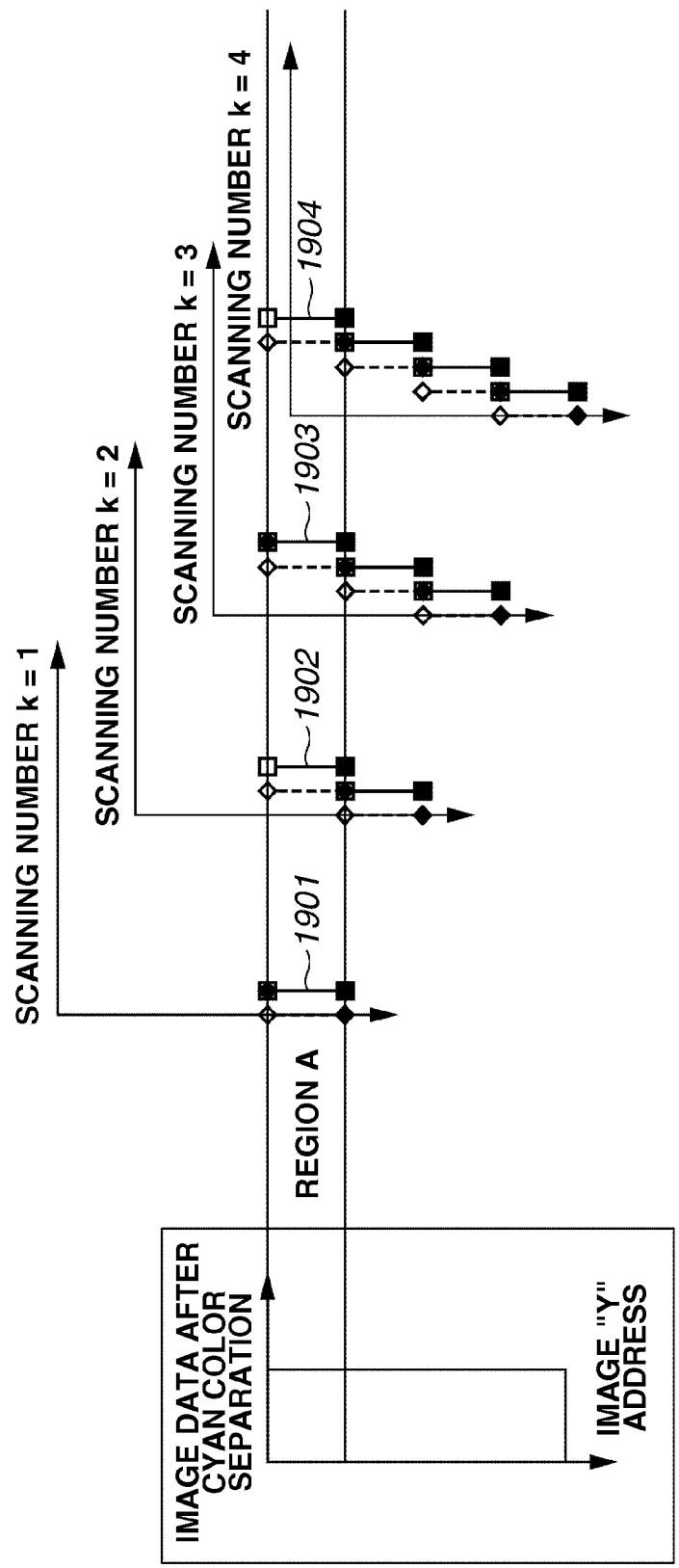
FIG. 20 illustrates a color resolution data cutting position Ycut (k) according to a scanning number.

Further, since the color resolution data cutting position, Ycut (k), is determined depending on the scanning number (k), when the scanning number is 1 to 4, the recording data is determined as illustrated in FIG. 20.

FIG. 20 illustrates a case where, when scanning is repeatedly performed while the paper is being fed, in the region (A), the image is formed by four-time-scanning with the scanning numbers (k) of 1 to 4.

FIG. 20 illustrates the recording data (lower recording data U_C_d and upper recording data O_C_d) for the nozzle position for each scanning number of cyan. It can be seen that the recording data varies depending on the scanning number. The recording data 1901 to 1904 corresponding to each record-scanning of cyan is determined by product of the color-separated image data and the recording data setting LUT 106, similarly to the equations (25) and (26).

As described above, in step S104, the recording data setting processing according to the present exemplary embodiment is completed. In step S104, the halftone processing unit 107 performs the halftone processing on the recording data to convert it into the binary halftone image data.

Figure 21:
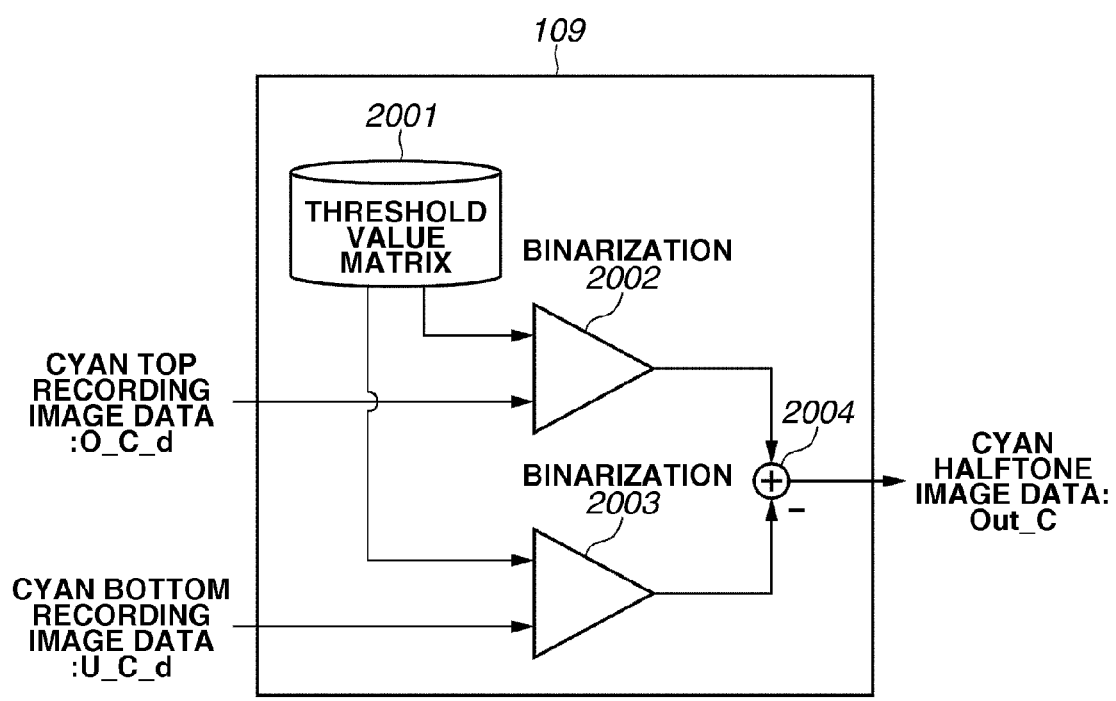
FIG. 21 is a block diagram illustrating a configuration of a halftone processing unit.
Figure 22:
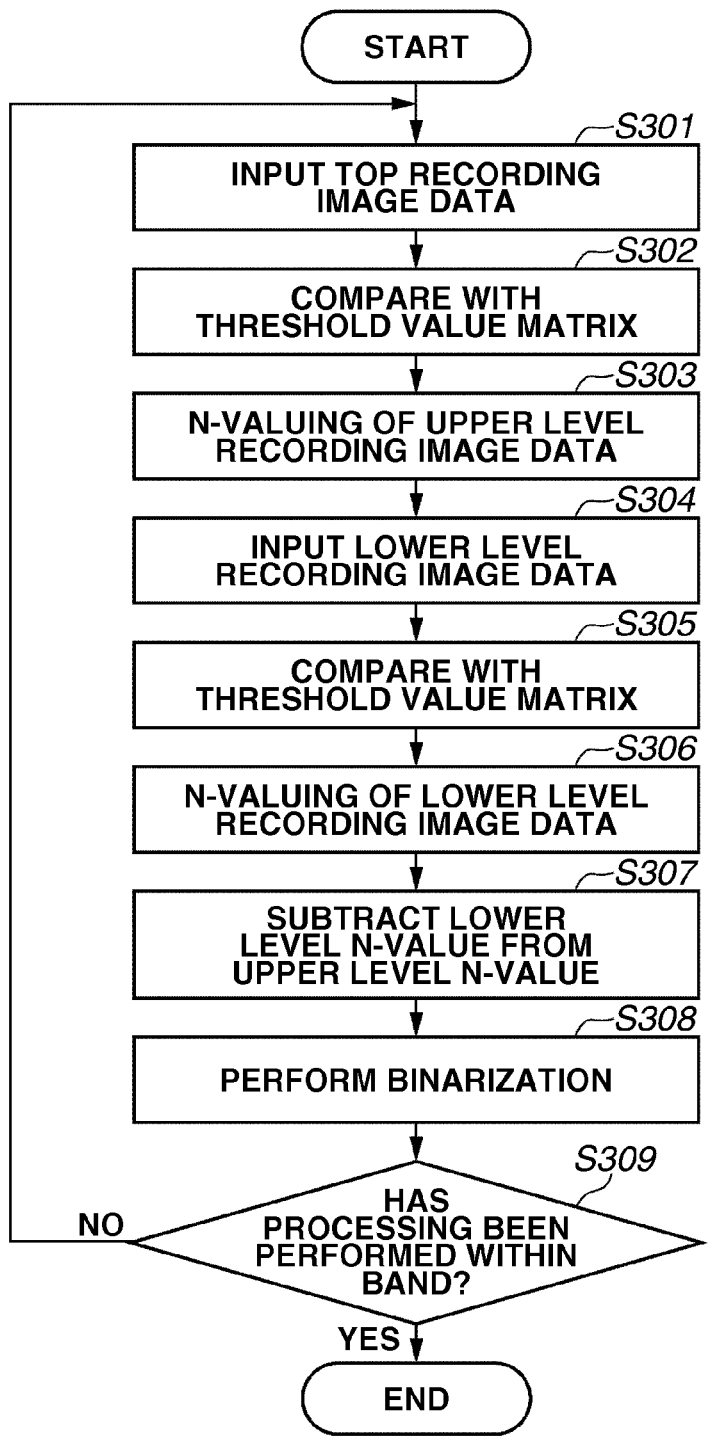
FIG. 22 is a flowchart illustrating processing performed by the halftone processing unit.

The halftone processing can use the known dither method. The halftone processing according to the present exemplary embodiment will be described herein below. FIG. 21 illustrates a configuration of the halftone processing unit 107 that can be applied to the present exemplary embodiment. FIG. 22 illustrates a flowchart of the halftone processing.

In step S301, the cyan upper recording data of O_C_d is input. In step S302, a binarization unit 2002 compares the cyan upper recording data of O_C_d with the threshold value matrix. FIG. 23 illustrates a threshold value matrix 2001 to be used by the binarization unit 2002. Each threshold value corresponds to the pixel in the image data. Therefore, the binarization unit 2002 compares the pixel value expressing the upper recording data for each pixel with the threshold value in the threshold value matrix.

(When "$O\_C\_d < Th$") $Out\_O\_C = 0$ \quad (27)

(When "$Th \le O\_C\_d$") $Out\_O\_C = 255$ \quad (28)

In step S303, the cyan upper halftone image data of Out_O_C is output. In step S304, the lower recording data is input. In step S305, a binarization unit 2003 compares the cyan lower recording data of U_C_d with the threshold value matrix 2001 to perform binarization using the equations described below.

(When "$U\_C\_d < Th$") $Out\_U\_C = 0$ \quad (29)

$$(\text{When } \text{"Th} \leq U\_C\_d\text{"}) \text{Out}\_U\_C = 255 \qquad (30)$$

In step S306, the cyan lower halftone image data of Out_U_C is output. It is preferable that the threshold value matrix 2001 have the blue noise characteristic enabling easy dispersing of the dot layout. According to the present exemplary embodiment, the same threshold value matrix is used for each color and each scanning number as the threshold value matrix 2001, however, different threshold value matrix may be used.

In step S307, a subtraction unit 2004 subtracts the cyan lower halftone image data from the cyan upper halftone image data.

In step S308, the halftone image data of Out_C to be output from the subtraction unit 2004 is calculated.

$$\text{Out}\_C = \text{Out}\_O\_C - \text{Out}\_U\_C \qquad (31)$$

In step S309, the above-described processing in steps S301 to S308 is performed at the addresses of (0, 0) to ((W−1, Nzzl−1) within the band to determine the dot layout of the halftone image data. Thus, the halftone processing in step S105 is completed.

Figure 24:
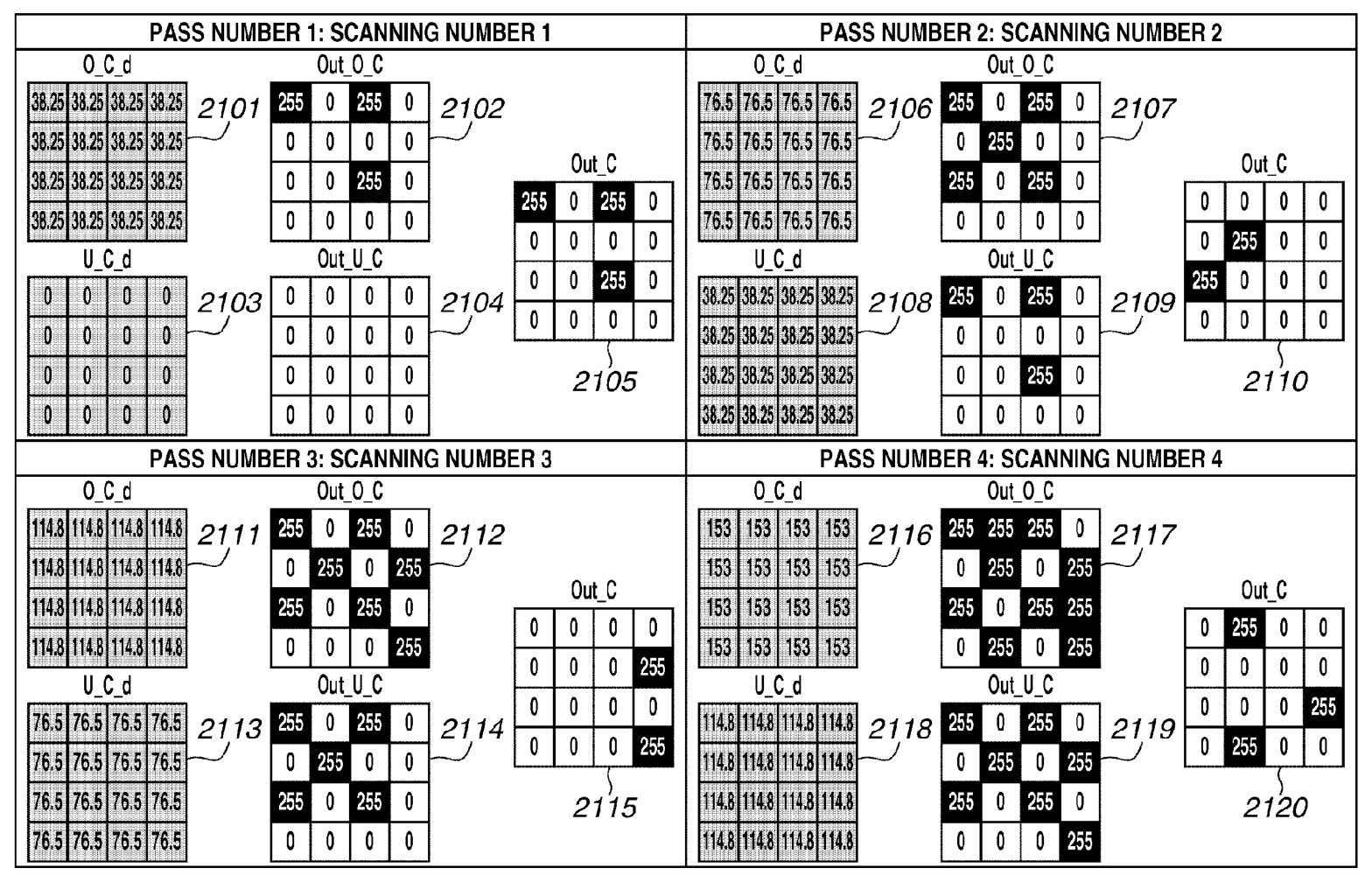

The cyan halftone image data of Out_C will be described herein below. FIG. 24 illustrates a calculation process of the halftone processing in the region (A) illustrated in FIG. 20. FIG. 25 illustrates a result of the halftone processing in the region (A) illustrated in FIG. 20. In FIG. 24, based on the cyan upper recording data of O_C_d (2101) for the scanning number 1, the cyan upper halftone image data of Out_O_C (2102) can be acquired. Further, based on the cyan lower recording data of U_C_d (2103) for the scanning number 1, the cyan lower halftone image data of Out_U_C (2104) can be acquired.

As a result, using the equation (31), the halftone image data of Out_C (2105) corresponding to the scanning number 1 can be acquired. Similarly, based on the cyan upper recording data of O_C_d (2106) for the scanning number 2, the cyan upper halftone image data of Out_O_C (2107) can be acquired. Further, based on the cyan lower recording data of U_C_d (2108) for the scanning number 2, the cyan lower halftone image data of Out_U_C (2109) can be acquired.

As a result, using the equation (31), the halftone image data of Out_C (2110) corresponding to the scanning number 2 can be acquired. It can be seen that the upper recording data of O_C_d corresponding to the scanning number 1 becomes the lower recording data of U_C_d for the scanning number 2. In other words, the upper recording data of O_C_d corresponding to the scanning number (m) is input as the lower recording data of U_C_d for the scanning number m+1.

In other words, when the (N)-pass printing is performed, the halftone image data of the (p) th pass in the same region (A) illustrated in FIG. 20 is determined based on difference between the accumulated dot pattern up to the (p)th pass and the accumulated dot pattern up to the (p−1)th pass.

With this arrangement, for example, the halftone image data of Out_C is formed such that the dot is not formed at the same position for the scanning numbers 1 to 4 as much as possible.

FIGS. 25A to 25D illustrate the image data of each pass in the region (A), the halftone image data where the passes are accumulated, and the halftone image data that can be finally acquired. FIGS. 25A to 25D illustrate the halftone image data accumulated by four-time-record-scanning. FIGS. 25A, and 25E to 25G illustrate the halftone image data formed by each scanning. In the image forming process, although the dots are accumulated based on the halftone image data, the dispersibility is favorably kept.

According to the second exemplary embodiment as described above, without using the restriction information, the similar effect to the first exemplary embodiment can be acquired.

A third exemplary embodiment will be described herein below. According to the first and second exemplary embodiments described above, the same threshold value matrix is used when the dither processing is performed for each scanning. According to the present exemplary embodiment, the threshold value matrix to be used is appropriately changed. With this arrangement, the restriction information is not required unlike the first exemplary embodiment, and two kinds of recording data do not need to be generated unlike the second exemplary embodiment, however, the similar effect can be realized to the first and second exemplary embodiments. Configurations and processing same as those in the above-described exemplary embodiments will not be repeatedly described.

Figure 27:
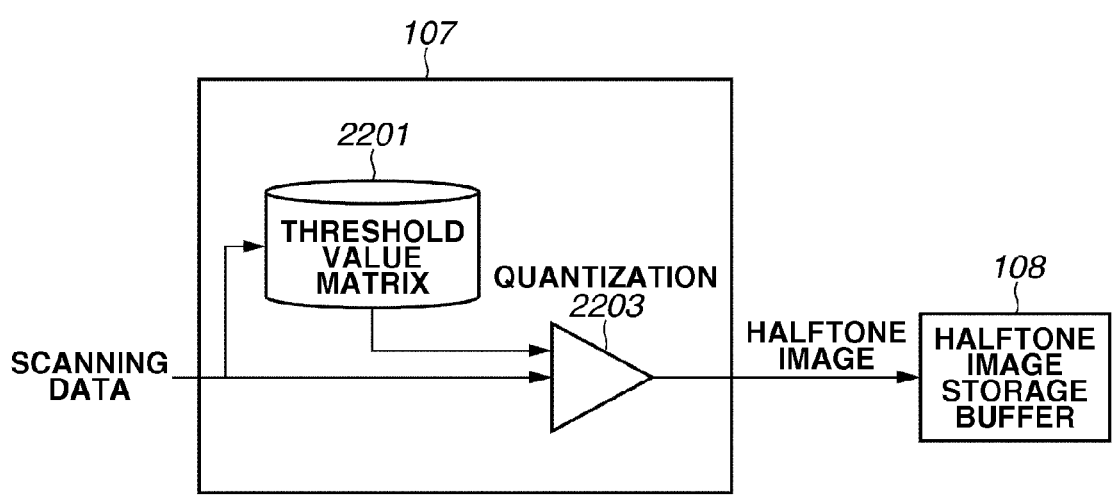
FIG. 27 is a block diagram illustrating a configuration of a halftone processing unit.
Figure 28:
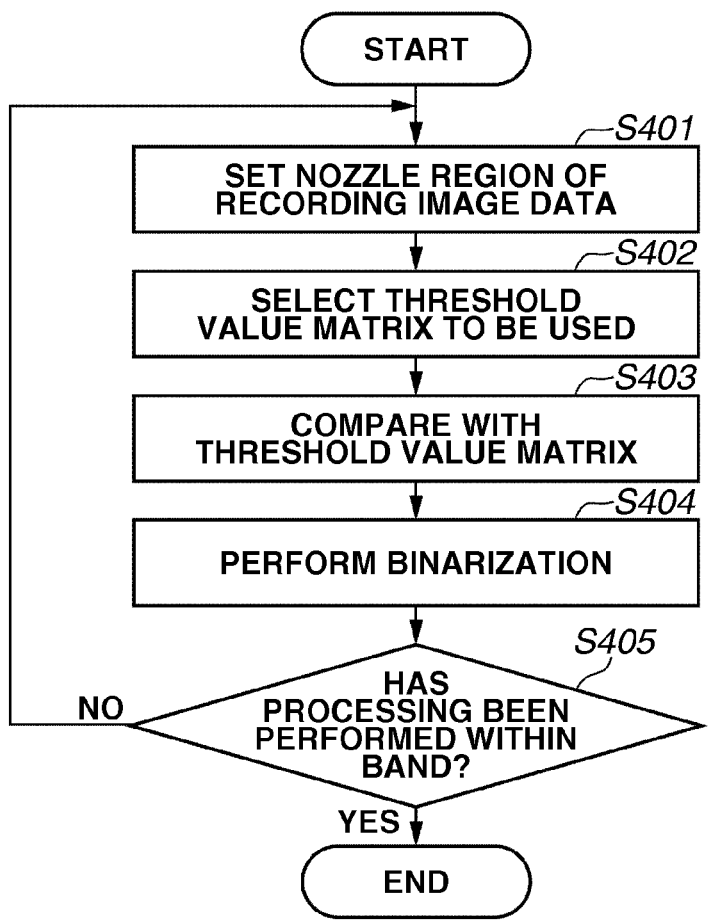
FIG. 28 is a flowchart illustrating processing performed by the halftone processing unit.

FIG. 27 is a block diagram illustrating a detailed configuration of the halftone processing unit 107. FIG. 28 illustrates a flow of the halftone processing performed by the halftone processing unit 107.

In step S401, a nozzle region corresponding to a recording element of the recording data of C_d is set. For example, in a case where the scanning number (k) is 4 illustrated in FIG. 9, any one of the regions forming the pass numbers 1 to 4 is set. When the region includes the pass number 1, which is the bottom end portion, a region number dm is set to 1. When the region includes the pass number 2, the region number dm is set to 2. When the region includes the pass number 3, the region number dm is set to 3. When the region includes the pass number 4, the region number dm is set to 4.

In step S402, the threshold value matrix to be used by a quantization unit 2203 is selected. According to the present exemplary embodiment, as the threshold value matrix to be used, as illustrated in FIG. 29, a plurality of threshold value matrixes Th 1 to Th_n are prepared. When the four-pass printing is performed, at least four kinds of threshold value matrixes are prepared. According to the region number dm set in step S401, the threshold value matrixes to be used are selected. In other words, the threshold value matrix to be used varies depending on the pass number. In step S403, the quantization unit 2203 compares the selected threshold value matrix with the recording data to perform binarization in step S404 as below.

$$(\text{When } \text{"}C\_d < Th\text{"}) \text{Out}\_c = 0 \qquad (32)$$

$$(\text{When } \text{"}Th \leq C\_d\text{"}) \text{Out}\_c = 255 \qquad (33)$$

"Th" is a selected threshold value matrix. The above-described threshold value matrix is previously set so that, when the passes 1 to 4 are formed using the plurality of threshold value matrixes, the image with the accumulated passes 1 and 2, the image with the accumulated passes 1, 2, and 3 and the image with the accumulated passes 1, 2, 3, and 4, have the blue noise characteristic.

In other words, the threshold value matrix formed of the above-described plurality of threshold value matrixes are previously optimized by a known optimization method to generate blue noise when the four kinds of the threshold value matrixes are combined. According to the present exemplary embodiment, the known method such as simulated annealing or genetic algorithm can be used. In step S405, the above-described processing in steps S401 to S404 are performed at the addresses from (0, 0) up to (W−1, Nzzl−1) within the band to output the halftone image data. Thus, the halftone processing in step S105 according to the present exemplary embodiment ends.

According to the present exemplary embodiment as described above, without using the restriction information like the first exemplary embodiment, and further without generating two kinds of recording data like the second exemplary embodiment, the accumulated halftone image data has the blue noise characteristic, and although the processing for forming the image is performed, the dispersibility can be improved.

Other Embodiments

Figure 26:
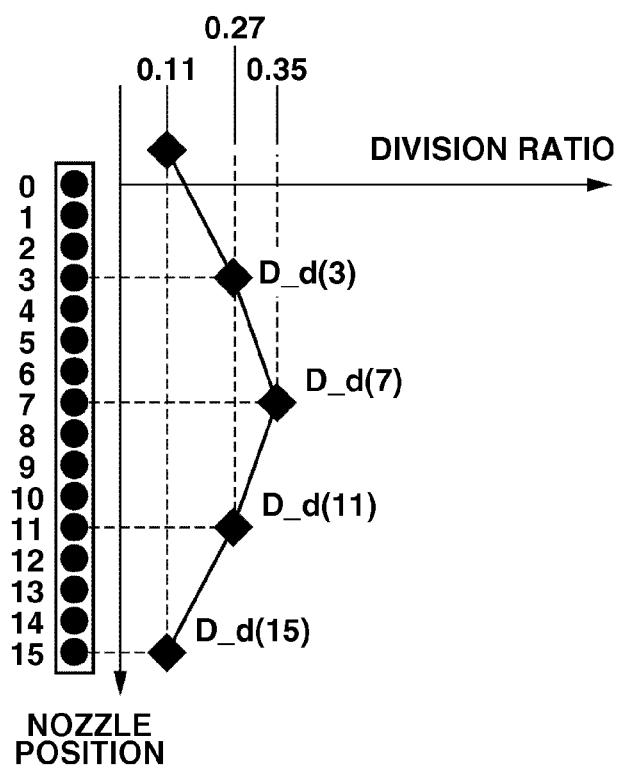
FIG. 26 illustrates an ink-value division ratio of a transformation example.

In each exemplary embodiment described above, as illustrated in FIG. 6, an example of the processing for performing uniform division at the ink-value division ratio of 0.25 for each nozzle is described. However, due to the shift caused by paper-feeding, a line may be visible if the uniform division is performed. Thus, as illustrated in FIG. 26, the division ratio can be increased at a center portion of the nozzle to make the line invisible. Further, in the exemplary embodiment described above, the image processing apparatus uses an inkjet recording method in which the recording head including a plurality of nozzles arranged in a predetermined direction is moved to perform scanning in a direction crossing the direction in which the nozzles are arranged, and discharges the ink onto the recording medium to form the image.

However, the present invention can be applied to a recording apparatus (e.g., of the thermal transfer method or the electrophotography method) that performs recording according to a method other than the inkjet method. In this case, the nozzles discharging ink drops correspond to the recording element and a laser emitting element for recording the dots. Moreover, the present invention can be applied to the recording apparatus of a full-line type including a recording head having a length corresponding to a recording width of the recording medium and performing recording by moving the recording medium with respect to the recording head.

The present invention can be also realized by supplying a system or an apparatus with the recording medium in which a program code of software for realizing a function of the above-described exemplary embodiment is recorded. In this case, the function of the above-described exemplary embodiment can be realized when a computer (or a central processing unit (CPU) or a micro processing unit (MPU)) of the system or the apparatus reads and executes the program code computer-readably stored in a non-transitory computer readable medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-173964 filed Aug. 9, 2011, which is hereby incorporated by reference herein in its entirety.

What is claimed is:

1. An image processing apparatus for generating halftone image data for forming an image on a recording medium by scanning a recording-element array including a plurality of recording elements and performing recording (N) times (N is an integer of 3 or more) in a same region on the recording medium, the recording-element array including a recording-element group for recording a first pass, a recording-element group for recording a second pass and a recording-element group for recording a Nth pass, and the recording medium being conveyed in a direction approximately perpendicular to a scanning direction of the recording-element array for a length according to the recording-element array in each scanning of the recording-element array, the image processing apparatus comprising:

a recording data setting unit configured to set upper recording data and lower recording data to be recorded in one scanning with the recording-element array using an upper division ratio for each recording element to generate the upper recording data and a lower division ratio for each recording element to generate the lower recording data for each recording corresponding to recording data obtained by dividing input image data into each recording, wherein the upper recording data represents an upper limit of the recording data and the lower recording data represents a lower limit of the recording data; and a halftone generation unit configured to generate halftone image data for each recording based on the upper recoding data and the lower recording data corresponding to each recording by a threshold matrix of a dot dispersion type, wherein the halftone generation unit refers to a threshold in the threshold matrix corresponding to a pixel position of a target pixel in halftone image data corresponding to one of N times of the recording and determines an output value of the target pixel at which a dot is on as a value of the target pixel in the halftone image data in a case that a pixel value of the target pixel in the upper recording data is larger than the threshold and a pixel value of the target pixel in the lower recording data is smaller than the threshold, wherein an upper division ratio corresponding to a recording-element group for recording a (p)th pass ($1 \leq p \leq N-1$) and a lower division ratio corresponding to a recording-element group for recording a (p+1)th pass are set based on a number of recording elements in the recording element array and positions of the recording elements in the recording element array, and wherein the recording data setting unit holds a set of an upper division ratio and a lower division ratio to be multiplied by image data in a first region corresponding to the recording element group for recording the first pass out of a region to be scanned with the recording element array in one scanning, a set of an upper division ratio and a lower division ratio to be multiplied by image data in a second region corresponding to the recording-element group for recording the second pass out of the region and a set of an upper division ratio and a lower division ratio to be multiplied by image data in an Nth region corresponding to the recording element group for recording the Nth pass out of the region, and sequentially generates upper recording data and lower recording data corresponding to each of the recording-element groups for each region to be recorded by scanning with the recording-element array.

2. The image processing apparatus according to claim 1, wherein the halftone generation unit is configured to generate the halftone image data corresponding to each of the recording performed (N) times, to improve dispersibility in all dot patterns accumulated until the image is formed.

3. The image processing apparatus according to claim 1, wherein the halftone generation unit is configured to perform a dither method using a same threshold value matrix on the each recording data.

4. The image processing apparatus according to claim 1, wherein the halftone generation unit is configured to perform a dither method using a different threshold value matrix on each recording data.

5. A non-transitory computer program encoded on a non-transitory computer readable medium configured to control a computer to function as each unit of an image processing apparatus according to claim 1.

6. A method for generating halftone image data for forming an image on a recording medium by scanning a recording-element array including a plurality of recording elements and performing recording (N) times (N is an integer of 3 or more) in a same region on the recording medium, the recording-element array including a recording-element group for recording a first pass, a recording-element group for recording a second pass and a recording-element group for recording a Nth pass, and the recording medium being conveyed in a direction approximately perpendicular to a scanning direction of the recording-element array for a length according to the recording-element array in each scanning of the recording-element array, the image processing apparatus comprising:

setting upper recording data and lower recording data for each recording corresponding to recording data to be recorded in one scan with the recording-element array using an upper division ratio for each recording element to generate the upper recording data and a lower division ratio for each recording element to generate the lower recording data obtained by dividing input image data into each recording, wherein the upper recording data represents an upper limit of the recording data and the lower recording data represents a lower limit of the recording data; and generating halftone image data for each recording based on the upper recoding data and the lower recording data corresponding to each recording by a threshold matrix of a dot dispersion type, wherein a halftone generating unit generating the halftone image data refers to a threshold in the threshold matrix corresponding to a pixel position of a target pixel in halftone image data corresponding to one of N times of the recording and determines an output value of the target pixel at which a dot is on as a value of the target pixel in the halftone image data in a case that a pixel value of the target pixel in the upper recording data is larger than the threshold and a pixel value of the target pixel in the lower recording data is smaller than the threshold, wherein an upper division ratio corresponding to a recording-element group for recording a (p)th pass ($1 \leq p \leq N-1$) and a lower division ratio corresponding to a recording-element group for recording a (p+1)th pass are set based on a number of recording elements in the recording element array and positions of the recording elements in the recording element array, and wherein a set of an upper division ratio and a lower division ratio to be multiplied by image data in a first region corresponding to the recording-element group for recording the first pass out of a region to be scanned with the recording-element array in one scanning is held, a set of an upper division ratio and a lower division ratio to be multiplied by image data in a second region corresponding to the recording-element group for recording the second pass out of the region and a set of an upper division ratio and a lower division ratio to be multiplied by image data in an Nth region corresponding to the recording-element group for recording the Nth pass out of the region, and sequentially generates upper recording data and lower recording data corresponding to each of the recording-element groups for each region to be recorded by scanning with the recording-element array.

7. A non-transitory computer readable medium encoded with instructions for performing the method according to claim 6.

8. The method of claim 6 wherein the dispersibility of the dot pattern after N passes has a blue noise characteristic.

9. The method of claim 6 further comprising sending the halftone image data to an image forming apparatus.

10. The image processing apparatus according to claim 1, wherein the halftone generation unit generates the (p)th halftone image data in such a manner that dispersibility of a dot pattern is improved in which each of the halftone image data corresponding to recording performed up to (p)th ($2 \leq p \leq N-1$) time is accumulated in the same region.

11. An image processing apparatus for generating halftone image data for forming an image on a recording medium by scanning a recording-element array including a plurality of recording elements and performing recording (N) times (N is an integer of 3 or more) in a same region on the recording medium, the recording-element array including a recording-element group for recording a first pass, a recording-element group for recording a second pass and a recording-element group for recording a Nth pass, and the recording medium being conveyed in a direction approximately perpendicular to a scanning direction of the recording-element array for a length according to the recording-element array in each scanning of the recording-element array, the image processing apparatus comprising:

a recording data setting unit configured to set upper recording data and lower recording data to be recorded in one scanning with the recording-element array using an upper division ratio for each recording element to generate the upper recording data and a lower division ratio for each recording element to generate the lower recording data for each recording corresponding to recording data obtained by dividing input image data into each recording, wherein the upper recording data represents an upper limit of the recording data and the lower recording data represents a lower limit of the recording data;

a halftone generation unit configured to uses a threshold matrix of a dot dispersion type to perform halftone processing on each of the upper recording data and the lower recording data corresponding to the recording a threshold matrix of a dot dispersion type; and a subtraction unit configured to generate halftone image data for each recording based on subtracting the result of halftone processing for the upper recoding data and the result of halftone processing for the lower recording data, wherein an upper division ratio corresponding to a recording-element group for recording a (p)th pass ($1 \leq p \leq N-1$) is set to a same ratio as a and a lower division ratio corresponding to a recording-element group for recording a (p+1)th pass are set based on a number of recording elements in the recording element array and positions of the recording elements in the recording element array, and wherein the recording data setting unit holds a set of an upper division ratio and a lower division ratio to be multiplied by image data in a first region corresponding to the recording-element group for recording the first pass out of a region to be scanned with the recording-element array in one scanning, a set of an upper division ratio and a lower division ratio to be multiplied by image data in a second region corresponding to the recording element group for recording the second pass out of the region and a set of an upper division ratio and a lower division ratio to be multiplied by image data in an Nth region corresponding to the recording-element group for recording the Nth pass out of the region, and sequentially generates upper recording data and lower recording data corresponding to each of the recording-element groups for each region to be recorded by scanning with the recording-element array.

12. A method for generating halftone image data for forming an image on a recording medium by scanning a recording-element array including a plurality of recording elements and performing recording (N) times (N is an integer of 3 or more) in a same region on the recording medium, the recording-element array including a recording-element group for recording a first pass, a recording-element group for recording a second pass and a recording-element group for recording a Nth pass, and the recording medium being conveyed in a direction approximately perpendicular to a scanning direction of the recording-element array for a length according to the recording-element array in each scanning of the recording-element array, the image processing apparatus comprising:

setting upper recording data and lower recording data to be recorded in one scanning with the recording-element array using an upper division ratio for each recording element to generate the upper recording data and a lower division ratio for each recording element to generate the lower recording data for each recording corresponding to recording data obtained by dividing input image data into each recording, wherein the upper recording data represents an upper limit of the recording data and the lower recording data represents a lower limit of the recording data;

using a threshold matrix of a dot dispersion type to perform halftone processing on each of the upper recording data and the lower recording data corresponding to the recording a threshold matrix of a dot dispersion type; and generating halftone image data for each recording based on subtracting the result of halftone processing for the upper recoding data and the result of halftone processing for the lower recording data, wherein an upper division ratio corresponding to a recording-element group for recording a (p)th pass ($1 \leq p \leq N-1$) and a lower division ratio corresponding to a recording-element group for recording a (p+1)th pass are set based on a number of recording elements in the recording element array and positions of the recording elements in the recording element array, and holding a set of an upper division ratio and a lower division ratio to be multiplied by image data in a first region corresponding to the recording-element group for recording the first pass out of a region to be scanned with the recording-element array in one scanning, a set of an upper division ratio and a lower division ratio to be multiplied by image data in a second region corresponding to the recording-element group for recording the second pass out of the region and a set of an upper division ratio and a lower division ratio to be multiplied by image data in an Nth region corresponding to the recording-element group for recording the Nth pass out of the region, and sequentially generates upper recording data and lower recording data corresponding to each of the recording element groups for each region to be recorded by scanning with the recording-element array.

* * * * *